US011277780B2

(12) United States Patent
Chong et al.

(10) Patent No.: US 11,277,780 B2
(45) Date of Patent: Mar. 15, 2022

(54) SERVICE SETUP METHOD AND DEVICE

(71) Applicant: HUAWEI TECHNOLOGIES CO.,LTD., Guangdong (CN)

(72) Inventors: Weiwei Chong, Shanghai (CN); Xiaobo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 16/282,535

(22) Filed: Feb. 22, 2019

(65) Prior Publication Data

US 2019/0191351 A1 Jun. 20, 2019

Related U.S. Application Data

(63) Continuation of application No. PCT/CN2016/096440, filed on Aug. 23, 2016.

(51) Int. Cl.
*H04W 36/30* (2009.01)
*H04W 72/08* (2009.01)
(Continued)

(52) U.S. Cl.
CPC .......... *H04W 36/30* (2013.01); *H04B 17/327* (2015.01); *H04W 24/10* (2013.01);
(Continued)

(58) Field of Classification Search
CPC ..... H04W 36/30; H04W 24/10; H04W 36/26; H04W 72/087; H04W 72/12; H04B 17/327
See application file for complete search history.

(56) References Cited

U.S. PATENT DOCUMENTS 10,880,224 B1 * 12/2020 Pawar ................... H04W 24/02
2003/0119515 A1  6/2003 Holler et al.
(Continued)

FOREIGN PATENT DOCUMENTS

CN      101242568 A     8/2008
CN      101277470 A    10/2008
(Continued)

OTHER PUBLICATIONS

3GPP TR23.750 V14.0.0, "3rd Generation Partnership Project; Technical Specification Group Services and System Aspects; Study for robust call setup for VoLTE subscriber in LTE (Release 14)", Jun. 22, 2016, pp. 1-30. XP051295183.
(Continued)

*Primary Examiner* — Luat Phung
(74) *Attorney, Agent, or Firm* — Leydig, Voit & Mayer, Ltd.

(57) ABSTRACT

Embodiments of this application relate to the field of communications technologies, and disclose a service setup method and a device, to resolve a problem that a service cannot be normally executed. The method includes: receiving, by an access network device, a first setup request; sending a first setup response to a first core network device or a first service application server, where the first setup response is used to indicate that the access network device accepts the first setup request; when radio channel quality of a first cell of a first network in which UE is located does not satisfy a service requirement of a first service carried in the first setup request, handing over the UE to a second cell of the first network, or handing over the UE to a third cell of a second network.

10 Claims, 16 Drawing Sheets

(51) Int. Cl.
*H04W 36/26* (2009.01)
*H04B 17/327* (2015.01)
*H04W 24/10* (2009.01)
*H04W 72/12* (2009.01)

(52) U.S. Cl.
CPC ......... *H04W 36/26* (2013.01); *H04W 72/087* (2013.01); *H04W 72/12* (2013.01)

(56) References Cited

U.S. PATENT DOCUMENTS

| | | | |
|---|---|---|---|
| 2008/0220792 A1 | 9/2008 | Fischer | |
| 2008/0305800 A1* | 12/2008 | Sharp | H04W 36/0066 455/438 |
| 2009/0061877 A1* | 3/2009 | Gallagher | H04W 76/12 455/436 |
| 2009/0290555 A1* | 11/2009 | Alpert | H04W 36/30 370/331 |
| 2009/0296660 A1* | 12/2009 | Weng | H04W 36/0022 370/332 |
| 2010/0014450 A1 | 1/2010 | Chun et al. | |
| 2010/0279684 A1 | 11/2010 | Salkintzis | |
| 2012/0115484 A1* | 5/2012 | Takahashi | H04W 36/08 455/436 |
| 2012/0122448 A1* | 5/2012 | Mueck | H04W 28/24 455/424 |
| 2012/0231759 A1 | 9/2012 | Shu et al. | |
| 2012/0329505 A1* | 12/2012 | Takagi | H04W 48/20 455/509 |
| 2013/0040683 A1* | 2/2013 | Siomina | H04W 28/0236 455/517 |
| 2014/0248897 A1* | 9/2014 | Sfar | H04L 47/824 455/453 |
| 2015/0011205 A1 | 1/2015 | Sasaki et al. | |
| 2015/0189631 A1* | 7/2015 | He | H04L 5/0098 455/418 |
| 2015/0264104 A1* | 9/2015 | Dunne | H04L 43/04 709/224 |
| 2016/0029281 A1 | 1/2016 | Zhou et al. | |
| 2016/0212674 A1* | 7/2016 | Nakamura | H04L 47/2416 |
| 2017/0195932 A1* | 7/2017 | McDiarmid | H04W 36/00837 |
| 2017/0295608 A1 | 10/2017 | Li et al. | |

FOREIGN PATENT DOCUMENTS

| | | |
|---|---|---|
| CN | 103731907 A | 4/2014 |
| CN | 103781182 A | 5/2014 |
| CN | 103841613 A | 6/2014 |
| CN | 104170420 A | 11/2014 |
| EP | 1359782 A1 | 11/2003 |
| EP | 2897440 A1 | 7/2015 |
| EP | 2975817 A1 | 1/2016 |
| EP | 3051876 A1 | 8/2016 |
| JP | 2005507624 A | 3/2005 |
| KR | 20090074408 A | 7/2009 |
| KR | 20130139685 A | 12/2013 |
| RU | 2408166 C2 | 12/2010 |
| RU | 2420883 C2 | 6/2011 |
| RU | 2517426 C2 | 5/2014 |
| RU | 2521615 C2 | 7/2014 |
| WO | 2013132893 A1 | 9/2013 |
| WO | 2015039449 A1 | 3/2015 |
| WO | 2016003805 A1 | 1/2016 |
| WO | 2016046698 A1 | 3/2016 |
| WO | 2016101857 A1 | 6/2016 |

OTHER PUBLICATIONS

Huawei, HiSilicon, CATR, CATT, China Unicom, Solution for challenging VoLTE coverage [online], 3GPP TSG-SA WG2#111 S2-153080, Oct. 13, 2015,total 13 pages.

3GPP TS 23.272 V13.4.0 (Jun. 2016);3rd Generation Partnership Project;Technical Specification Group Services and System Aspects;Circuit Switched (CS) fallback in Evolved Packet System (EPS);Stage 2(Release 13),total 103 pages.

3GPP TS 23.401 V14.0.0 (Jun. 2016);3rd Generation Partnership Project;Technical Specification Group Services and System Aspects;General Packet Radio Service (GPRS) enhancements for Evolved Universal Terrestrial Radio Access Network (E-UTRAN) access(Release 14),total 374 pages.

3GPP TS 23.203 V14.0.0 (Jun. 2016);3rd Generation Partnership Project;Technical Specification Group Services and System Aspects;Policy and charging control architecture(Release 14),total 245 pages.

3GPP TS 23.228 V14.0.0 (Jun. 2016);3rd Generation Partnership Project;Technical Specification Group Services and System Aspects;IP Multimedia Subsystem (IMS);Stage 2(Release 14),total 316 pages.

3GPP TS 36.413 V13.3.0 (Jun. 2016);3rd Generation Partnership Project;Technical Specification Group Radio Access Network;Evolved Universal Terrestrial Radio Access Network(E-UTRAN);S1 Application Protocol (S1AP)(Release 13), total 331 pages.

3GPP TS 36.300 V13.4.0 (Jun. 2016);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 310 pages.

3GPP TS 36.331 V13.2.0 (Jun. 2016);3rd Generation Partnership Project;Technical Specification Group Radio Access Network;Evolved Universal Terrestrial Radio Access (E-UTRA);Radio Resource Control (RRC);Protocol specification (Release 13),total 623 pages.

Ericsson, "Update of Solution 2.1: QoS functions and distribution", SA WG2 Meeting #115 S2-162900(revision of S2-162776),May 23-27, 2016, Nanjing, P.R. China,total 8 pages.

Huawei et al,"Solution for how to avoid call setup failure and shorten call setup time for VoLTE subscriber in LTE with bad coverage overlaid with 2/3G CS coverage" ,SA WG2 Meeting #113,S2-160359,Jan. 25-29, 2015, St. Kitts, total 8 pages.

* cited by examiner

SERVICE SETUP METHOD AND DEVICE

CROSS-REFERENCE TO RELATED APPLICATIONS

This application is a continuation of International Application No. PCT/CN2016/096440, filed on Aug. 23, 2016. The disclosure of the aforementioned application is hereby incorporated by reference in its entirety.

TECHNICAL FIELD

This application relates to the field of communications technology, and in particular, to a service setup method and a device.

BACKGROUND

A voice service in a Long Term Evolution (LTE) network is referred to as a voice over Long Term Evolution (VoLTE) service. Currently, more operators start to use VoLTE for commercial purposes, and more user equipment UE) can support the VoLTE service.

However, in the prior art, when UE is in a weak coverage area of an LTE network, normal execution of a VoLTE service cannot be ensured, or execution of a VoLTE service leads to relatively poor user experience.

SUMMARY

Embodiments of this application provide a service setup method and a device, to resolve a problem that because a radio resource is forcibly allocated to UE after a service setup request is received, a service cannot be normally executed or execution of a service leads to relatively poor user experience.

According to a first aspect, a service setup method is provided. The method includes: receiving, by an access network device, a first setup request from a first core network device or a first service application server, where the first setup request carries a service requirement of a first service, and the service requirement of the first service is used to indicate, to the access network device, a radio channel quality requirement for user equipment UE to execute the first service; sending, by the access network device, a first setup response to the first core network device or the first service application server, where the first setup response is used to notify the first core network device or the first service application server that the access network device accepts the first setup request; and when the access network device determines that radio channel quality of a first cell of a first network in which the UE is located does not satisfy the service requirement of the first service, sending, by the access network device, a first notification message to the first core network device or the first service application server, where the first notification message is used to notify the first core network device or the first service application server that the radio channel quality of the first cell does not satisfy the service requirement of the first service; or handing over the UE to a second cell of the first network; or handing over the UE to a third cell of a second network.

In the technical solution of this embodiment, because the first setup request received by the access network device carries the service requirement of the first service, after the access network device accepts the first setup request (to be specific, sends the first setup response to the service application server), the access network device may use the received service requirement information as an admission threshold of service setup. In other words, when radio signal quality of the cell in which the UE is located does not satisfy the service requirement, the access network device notifies the service application server, so that the service application server makes a corresponding adjustment; or the access network device may hand over the UE to another cell that can satisfy the service requirement, to complete service setup in the another cell. By using this solution, the access network device may use, as an admission threshold of service setup, a service requirement that is of a to-be-set up service and that is from the service application server, thereby avoiding prior-art problems such as an error and inflexibility caused by determining an admission threshold only based on an empirical value. In addition, for a scenario in which signal quality of the cell of the UE does not reach the admission threshold (to be specific, a scenario in which the radio channel quality of the first cell does not satisfy the service requirement of the to-be-set up service), for example, for a coverage area in which a network signal is weak, a network side may adjust the service requirement depending on an actual network status, or hand over the UE to another cell, to ensure that after a service is set up, the service can be normally executed and user experience during the execution of the service is improved.

In a possible implementation, the access network device may send the first setup response to the first core network device or the first service application server after determining that the radio channel quality of the first cell satisfies the service requirement of the first service. Specifically, before the "sending, by the access network device, a first setup response to the first core network device or the first service application server", the method in this embodiment of this application may further include: determining, by the access network device, that the radio channel quality of the first cell satisfies the service requirement of the first service.

In a possible implementation, the access network device may allocate a radio resource to the first service after receiving the first setup request and determining that the radio channel quality of the first cell satisfies the service requirement of the first service. Specifically, before the "sending, by the access network device, a first setup response to the first core network device or the first service application server", the method in this embodiment of this application may further include: allocating, by the access network device, the radio resource to the first service.

In a possible implementation, the service application server may indicate, by using indication information (for example, first indication information) included in the service requirement of the first service, the access network device to: send the first notification message to the core network device or the service application server when the radio channel quality of the first cell does not satisfy the service requirement of the first service. Specifically, the "sending, by the access network device, a first notification message to the first core network device or the first service application server" may include: if the access network device determines that the service requirement of the first service includes the first indication information, sending the first notification message to the first core network device or the first service application server. The first indication information is used to indicate the access network device to: send the first notification message to the first core network device or the first service application server when the radio channel quality of the first cell does not satisfy the service requirement of the first service.

In a possible implementation, the service application server may indicate, by using indication information (for example, second indication information) included in the service requirement of the first service, the access network device to: hand over the UE to the second cell when the radio channel quality of the first cell does not satisfy the service requirement of the first service. Specifically, the "handing over, by the access network device, the UE to a second cell of the first network" may include: if the access network device determines that the service requirement of the first service includes the second indication information and the access network device determines that the second cell whose radio channel quality satisfies the service requirement of the first service exists, handing over, by the access network device, the UE to the second cell. The second indication information is used to indicate the access network device to: hand over the UE to the second cell when the radio channel quality of the first cell does not satisfy the service requirement of the first service.

In a possible implementation, the service application server may indicate, by using indication information (for example, third indication information) included in the service requirement of the first service, the access network device to: hand over the UE to the third cell when the radio channel quality of the first cell does not satisfy the service requirement of the first service. Specifically, the "handing over, by the access network device, the UE to a third cell of a second network" may include: if the access network device determines that the service requirement of the first service includes the third indication information and the access network device determines that the third cell whose radio channel quality satisfies the service requirement of the first service exists, handing over, by the access network device, the UE to the third cell. The third indication information is used to indicate the access network device to: hand over the UE to the third cell when the radio channel quality of the first cell does not satisfy the service requirement of the first service.

In this solution, the access network device may perform "sending the first notification message to the core network device or the service application server", "handing over the UE to the second cell", or "handing over the UE to the third cell" according to an indication of the indication information in the service requirement of the first service when the radio channel quality of the first cell does not satisfy the service requirement of the first service.

In a possible implementation, the access network device may determine, in a manner of sending a measurement control command to the UE, that the radio channel quality of the first cell does not satisfy the service requirement of the first service. Specifically, after the "sending, by the access network device, a first setup response to the first core network device or the first service application server", the method in this embodiment of this application may further include: delivering, by the access network device, a first measurement control command to the UE. The first measurement control command is used to indicate the UE to measure the radio channel quality of the first cell, and send a first measurement report to the access network device when the radio channel quality of the first cell does not satisfy the service requirement of the first service, and the first measurement report is used to indicate, to the access network device, that the radio channel quality of the first cell does not satisfy the service requirement of the first service.

In a possible implementation, after receiving the first setup request used to indicate the access network device to create the first service, the access network device may further receive a service setup request used to indicate the access network device to create another service. Specifically, after the "sending, by the access network device, a first setup response to the first core network device or the first service application server", the method in this embodiment of this application may further include: receiving, by the access network device, a second setup request from a second core network device or a second service application server, where the second setup request carries a service requirement of a second service, and the service requirement of the second service is used to indicate, to the access network device, a radio channel quality requirement for the UE to execute the second service; determining, by the access network device, that the service requirement of the second service is higher than the service requirement of the first service; and delivering, by the access network device, a second measurement control command to the UE. The second measurement control command is used to indicate the UE to measure the radio channel quality of the first cell, and send a second measurement report to the access network device when the radio channel quality of the first cell does not satisfy the service requirement of the second service, and the second measurement report is used to indicate, to the access network device, that the radio channel quality of the first cell does not satisfy the service requirement of the second service.

It may be figured out that after receiving the second setup request carrying the service requirement of the second service, the access network device may directly compare the service requirement of the first service with the service requirement of the second service, and when the service requirement of the second service is higher than the service requirement of the first service, determine, in a manner of delivering a measurement control command to the UE, whether the radio channel quality of the first cell satisfies the service requirement of the second service. If the service requirement of the second service is lower than the service requirement of the first service, the access network device does not need to continue to determine whether the radio channel quality of the first cell satisfies the service requirement of the second service, but directly uses the service requirement of the first cell as an admission threshold of service setup, to set up the second service.

In a possible implementation, the second cell or the third cell whose radio channel quality satisfies the service requirement of the first service may not exist. In this case, the method in this embodiment of this application may further include: if the access network device determines that the second cell or the third cell whose radio channel quality satisfies the service requirement of the first service does not exist, sending, by the access network device, a second notification message to the first core network device or the first service application server. The second notification message is used to notify the first core network device or the first service application server that the radio channel quality of the first cell does not satisfy the service requirement of the first service and the second cell or the third cell whose radio channel quality satisfies the service requirement of the first service does not exist. In this way, when the second cell or the third cell whose radio channel quality satisfies the service requirement of the first service does not exist, the access network device may send the second notification message to the service application server to indicate that "the radio channel quality of the first cell does not satisfy the service requirement of the first service, and the second cell or the third cell whose radio channel quality satisfies the service requirement of the first service does not exist", so that the service application server may adjust the service requirement of the first service depending on an actual network status.

In a possible implementation, when the second cell or the third cell whose radio channel quality satisfies the service requirement of the first service does not exist, the access network device may delete the radio resource allocated to the first service. In this way, the radio resource allocated to the first service can be released in a timely manner.

In a possible implementation, both the first notification message and the second notification message may carry at least one of the radio channel quality of the first cell, terminal type information of the UE, information about a carrier frequency accessed by the UE, location information of the UE, load information of the first cell, a radio access technology (RAT) of the first network, recommended codec information, and bandwidth information of the first service. It may be figured out that the information carried in the first notification message and the second notification message may be used by the service application server to re-determine a service requirement of the first service, to be specific, an updated service requirement of the first service.

In a possible implementation, the location information of the UE includes at least one of a cell identity of the UE, a base station identity of the UE, a tracking area identity (TAI) of the UE, a location area identity (LAI) of the UE, and a routing area identity (RAI) of the UE.

In a possible implementation, after receiving the first notification message or the second notification message used to indicate that the radio channel quality of the first cell does not satisfy the service requirement of the first service, the service application server may modify the service requirement of the first service to obtain the updated service requirement of the first service, and re-initiate a service setup request to the access network device. Specifically, after the "sending, by the access network device, a first notification message or a second notification message to the first core network device or the first service application server", the method in this embodiment of this application may further include: receiving, by the access network device, a first service modification request from the first core network device or the first service application server, where the first service modification request carries the updated service requirement of the first service. The access network device may receive the first service modification request that is from the service application server and that is used to request to modify the first service, and the updated service requirement of the first service carried in the first service modification request may be determined by the service application server based on the information carried in the first notification message or in the second notification message.

In a possible implementation, the access network device may determine, in a manner of sending a policy control command to the UE, whether the second cell or the third cell whose radio channel quality satisfies the service requirement of the first service exists. A method for determining, by the access network device, whether the second cell or the third cell whose radio channel quality satisfies the service requirement of the first service exists is described in this embodiment of this application by using a fourth cell to represent the second cell or the third cell. Specifically, the access network device may determine, by using the following two manners, that "the fourth cell whose radio channel quality satisfies the service requirement of the first service exists". In a manner 1, the access network device delivers a measurement control command to the UE, where the measurement control command is used to indicate the UE to measure the radio channel quality of the fourth cell; the access network device receives a measurement report reported by the UE, where the measurement report carries a measurement result obtained after the UE measures the radio channel quality of the fourth cell; and the access network device determines, based on the measurement result, that the fourth cell whose radio channel quality satisfies the service requirement of the first cell exists. In a manner 2, the access network device delivers a measurement control command to the UE, where the measurement control command carries a measurement report condition determined based on the service requirement of the first service, the measurement control command is used to indicate the UE to measure the radio channel quality of the fourth cell, and the measurement report condition is used to indicate the UE to: report a measurement report to the access network device when the UE determines that the radio channel quality of the fourth cell satisfies the measurement report condition; and if the access network device receives the measurement report reported by the UE, the access network device determines that the fourth cell whose radio channel quality satisfies the service requirement of the first service exists.

In a possible implementation, the service requirement of the first service includes at least one of service type indication information of the first service, a radio channel requirement parameter of the first service, codec information of the first service, a codec information list of the UE, and a terminal type of the UE, and the codec information list of the UE includes codec information supported by both the UE and the service application server. It may be figured out that one UE may support at least two types of codec information, and each type of codec information corresponds to one codec type and one codec rating set.

In a possible implementation, the radio channel requirement parameter of the first service includes at least one of a reference signal received power (RSRP) requirement, a reference signal received quality (RSRQ) requirement, and a signal to interference plus noise ratio (SINR) requirement.

In a possible implementation, the codec information of the first service includes codec type information of the first service and codec rating set information of the first service.

In a possible implementation, the radio channel quality includes at least one of RSRP, RSRQ, and an SINR.

In a possible implementation, the terminal type information of the UE includes at least one of an international mobile equipment identity (IMEI) of the UE, a type approval code (TAC) of the IMEI, and an international mobile subscriber identity (IMSI) of the UE.

In a possible implementation, a specific method for "determining, by the access network device, that radio channel quality of a first cell of a first network in which the UE is located does not satisfy the service requirement of the first service" may be: determining, by the access network device, that the radio channel quality of the first cell satisfies radio channel quality required by at least one type of codec information in the codec information list of the UE but the radio channel quality of the first cell does not satisfy radio channel quality required by the codec information of the first service.

In a possible implementation, after the determining, by the access network device, that the radio channel quality of the first cell satisfies radio channel quality required by at least one type of codec information in the codec information list of the UE, the method further includes: determining, by the access network device, the recommended codec information.

In a possible implementation, the first network may be either of a fifth generation mobile communications technology (5G) network and a fourth generation mobile communications technology (4G) network, and the second network may be any one of a 4G network, a third generation mobile communications technology (3G) network, and a second generation mobile communications technology (2G) network.

According to a second aspect, an embodiment of this application provides a service setup method. The method includes: sending, by a service application server, a first setup request to an access network device, where the first setup request carries a service requirement of a first service, and the service requirement of the first service is used to indicate, to the access network device, a radio channel quality requirement for user equipment UE to execute the first service; receiving, by the service application server, a first setup response from the access network device, where the first setup response is used to notify the service application server that the access network device accepts the first setup request; and receiving, by the service application server, a first notification message from the access network device, where the first notification message is used to notify the service application server that radio channel quality of a first cell of a first network in which the UE is located does not satisfy the service requirement of the first service; or receiving, by the service application server, a second notification message from the access network device, where the second notification message is used to notify the service application server that radio channel quality of a first cell of a first network in which the UE is located does not satisfy the service requirement of the first service, the second notification message is used to notify a first core network device or the service application server that the radio channel quality of the first cell does not satisfy the service requirement of the first service and a second cell or a third cell whose radio channel quality satisfies the service requirement of the first service does not exist, the second cell is located in the first network, and the third cell is located in a second network.

Because the first setup request from the service application server to the core network device or the access network device carries the service requirement of the first service, after the access network device accepts the first setup request (to be specific, sends the first setup response to the service application server), the access network device may use the received service requirement information as an admission threshold of service setup. In other words, when radio signal quality of the cell in which the UE is located does not satisfy the service requirement, the access network device notifies the service application server, so that the service application server makes a corresponding adjustment; or the access network device may hand over the UE to another cell that can satisfy the service requirement, to complete service setup in the another cell. By using this solution, the access network device may use, as an admission threshold of service setup, a service requirement that is of a to-be-set up service and that is from the service application server, thereby avoiding prior-art problems such as an error and inflexibility caused by determining an admission threshold only based on an empirical value. In addition, for a scenario in which the signal quality of the cell of the UE does not reach the admission threshold (to be specific, a scenario in which the radio channel quality of the first cell does not satisfy the service requirement of the to-be-set up service), for example, for a coverage area in which a network signal is weak, a network side may adjust the service requirement depending on an actual network status, or hand over the UE to another cell, to ensure that after a service is set up, the service can be normally executed and user experience during the execution of the service is improved.

In a possible implementation, the service application server may determine the service requirement of the first service before sending the first setup request to the access network device. Specifically, the service application server may determine the service requirement of the first service by using the following manners. In a manner 1, the service application server determines the service requirement of the first service based on at least one of a mean opinion score (MOS) requirement of the first service, the radio channel quality of the first cell, terminal type information of the UE, information about a carrier frequency accessed by the UE, location information of the UE, codec information of the first service, load information of the first cell, radio access technology RAT information of the first network, and bandwidth information of the first service. In a manner 2, the service application server sends a first query request to a third-party network device, where the first query request carries at least one of a MOS requirement of the first service, the radio channel quality of the first cell, terminal type information of the UE, information about a carrier frequency accessed by the UE, location information of the UE, codec information of the first service, load information of the first cell, RAT information of the first network, and bandwidth information of the first service; and the service application server receives a first query response from the third-party network device, where the first query response carries the service requirement of the first service.

In a possible implementation, before determining the service requirement of the first service, the service application server may first obtain related information used to determine the service requirement of the first service, for example, "at least one of the radio channel quality of the first cell, the terminal type information of the UE, the information about the carrier frequency accessed by the UE, the location information of the UE, the codec information of the first service, the load information of the first cell, the RAT information of the first network, and the bandwidth information of the first service". Specifically, before the "determining, by the service application server, the service requirement of the first service or receiving, by the service application server, a first query response from the third-party network device", the method in this embodiment of this application may further include: sending, by the service application server, a second query request to the first core network, the UE, or the access network device; and receiving, by the service application server, a second query response from the first core network, the UE, or the access network device, where the second query response carries at least one of the radio channel quality of the first cell, the terminal type information of the UE, the information about the carrier frequency accessed by the UE, the location information of the UE, the codec information of the first service, the load information of the first cell, the RAT information of the first network, and the bandwidth information of the first service.

In a possible implementation, the service application server may further obtain, by using the following manner, the related information used to determine the service requirement of the first service. Specifically, before the "determining, by the service application server, the service requirement of the first service or receiving, by the service application server, a first query response from the third-party network device", the method in this embodiment of this application may further include: receiving, by the service application server, a first message from the UE, where the first message carries at least one of the radio channel quality of the first cell, the terminal type information of the UE, the information about the carrier frequency accessed by the UE, the location information of the UE, the codec information of the first service, the load information of the first cell, the RAT information of the first network, and the bandwidth information of the first service.

In a possible implementation, the service requirement of the first service includes first indication information, second indication information, or third indication information. After receiving the first notification message or the second notification message, the service application server may determine an updated service requirement of the first service based on the MOS requirement of the first service or "at least one of the radio channel quality of the first cell, the terminal type information of the UE, the information about the carrier frequency accessed by the UE, the location information of the UE, the codec information of the first service, the load information of the first cell, the RAT information of the first network, and the bandwidth information of the first service" that are carried in the first notification message or the second notification message. Alternatively, the service application server may send a third query request to the third-party network device, where the third query request carries at least one of the MOS requirement of the first service, and the radio channel quality of the first cell, the terminal type information of the UE, the information about the carrier frequency accessed by the UE, the location information of the UE, the codec information of the first service, the load information of the first cell, the RAT information of the first network, the bandwidth information of the first service, and recommended codec information that are carried in the first notification message or the second notification message; and the service application server receives a third query response from the third-party network device, where the first query response carries an updated service requirement of the first service.

In a possible implementation, after the "determining, by the service application server, an updated service requirement of the first service or receiving a third query response from the third-party network device", the method in this embodiment of this application may further include: sending, by the service application server, a first service modification request to the access network device, where the first service modification request carries the updated service requirement of the first service.

In a possible implementation, after the receiving, by the service application server, a first notification message or a second notification message from the access network device, the method further includes: determining, by the service application server based on at least one of the radio channel quality of the first cell, the terminal type information of the UE, the information about the carrier frequency accessed by the UE, the location information of the UE, the codec information of the first service, the load information of the first cell, the RAT information of the first network, the bandwidth information of the first service, and the recommended codec information that are carried in the first notification message or the second notification message, to terminate the first service; and sending, by the service application server, a first service deletion message to the access network device or the UE, where the first service deletion message is used to indicate the access network device or the UE to terminate the first service.

In a possible implementation, the service application server may send the first setup request to the access network device by using the following manners. In a manner 1, the service application server delivers the first setup request to the access network device by using the core network device. In a manner 2, the service application server delivers the first setup request to the access network device by using an interface between the service application server and the access network device.

In a possible implementation, updated codec information of the first service included in the updated service requirement of the first service is second codec information. The method in this embodiment of this application further includes: determining, by the service application server, the codec information of the first service as first codec information; determining the updated codec information of the first service as the second codec information; and changing the codec information of the first service from the first codec information to the second codec information.

In a possible implementation, the service application server sends a second message to the UE. The second message is used to indicate that the codec information of the first service is changed from the first codec information to the second codec information.

In a possible implementation, the service application server may further change the codec information of the first service from the first codec information to the second codec information when determining that a radio channel requirement corresponding to the first codec information is higher than a radio channel requirement corresponding to the second codec information.

It should be noted that for detailed descriptions of the service requirement of the first service, the updated service requirement of the first service, the radio channel requirement of the first service, the codec information of the first service, the radio channel quality, the terminal type information of the UE, the first network, the second network, the first indication information, the second indication information, the third indication information, the first notification message, the second notification message, and the information carried in the first notification message and the second notification message in the second aspect and the possible implementations of the second aspect of the embodiments of this application, reference may be made to the related descriptions in the possible implementations of the first aspect of the embodiments of this application, and details are not described in this embodiment of this application again.

According to a third aspect, an access network device is provided. The access network device includes a receiving module, a sending module, a determining module, and a handover module. The receiving module is configured to receive a first setup request from a first core network device or a first service application server, where the first setup request carries a service requirement of a first service, and the service requirement of the first service is used to indicate, to the access network device, a radio channel quality requirement for UE to execute the first service. The sending module is configured to send a first setup response to the first core network device or the first service application server, where the first setup response is used to notify the first core network device or the first service application server that the access network device accepts the first setup request. The determining module is configured to determine whether radio channel quality of a first cell of a first network in which the UE is located satisfies the service requirement of the first service. The sending module is configured to: if the determining module determines that the radio channel quality of the first cell does not satisfy the service requirement of the first service, send a first notification message to the first core network device or the first service application server, where the first notification message is used to notify the first core network device or the first service application server that the radio channel quality of the first cell does not satisfy the service requirement of the first service; or the handover module is configured to: if the determining module determines that the radio channel quality of the first cell does not satisfy the service requirement of the first service, hand over the UE to a second cell of the first network, or hand over the UE to a third cell of a second network.

In a possible implementation, the determining module is further configured to: before the sending module sends the first setup response to the first core network device or the first service application server, determine that the radio channel quality of the first cell satisfies the service requirement of the first service. The sending module is specifically configured to: if the determining module determines that the radio channel quality of the first cell satisfies the service requirement of the first service, send the first setup response to the first core network device or the first service application server.

In a possible implementation, the access network device may further include an allocation module. The allocation module is configured to: before the sending module sends the first setup response to the first core network device or the first service application server, allocate a radio resource to the first service.

In a possible implementation, the determining module is further configured to determine whether the service requirement of the first service includes first indication information. The sending module is specifically configured to: if the determining module determines that the service requirement of the first service includes the first indication information, send the first notification message to the first core network device or the first service application server. The first indication information is used to indicate the access network device to: send the first notification message to the first core network device or the first service application server when the radio channel quality of the first cell does not satisfy the service requirement of the first service.

In a possible implementation, the determining module is further configured to: determine whether the service requirement of the first service includes second indication information; and determine whether the second cell whose radio channel quality satisfies the service requirement of the first service exists. The handover module is specifically configured to: if the determining module determines that the service requirement of the first service includes the second indication information and the second cell whose radio channel quality satisfies the service requirement of the first service exists, hand over the UE to the second cell. The second indication information is used to indicate the access network device to: hand over the UE to the second cell when the radio channel quality of the first cell does not satisfy the service requirement of the first service.

In a possible implementation, the determining module is further configured to: determine whether the service requirement of the first service includes third indication information; and determine whether the third cell whose radio channel quality satisfies the service requirement of the first service exists. The handover module is specifically configured to: if the determining module determines that the service requirement of the first service includes the third indication information and the third cell whose radio channel quality satisfies the service requirement of the first service exists, hand over the UE to the third cell. The third indication information is used to indicate the access network device to: hand over the UE to the third cell when the radio channel quality of the first cell does not satisfy the service requirement of the first service.

In a possible implementation, the sending module is further configured to: after sending the first setup response to the first core network device or the first service application server, deliver a first measurement control command to the UE. The first measurement control command is used to indicate the UE to measure the radio channel quality of the first cell, and send a first measurement report to the access network device when the radio channel quality of the first cell does not satisfy the service requirement of the first service, and the first measurement report is used to indicate, to the access network device, that the radio channel quality of the first cell does not satisfy the service requirement of the first service.

In a possible implementation, the receiving module is further configured to: after the sending module sends the first setup response to the first core network device or the first service application server, receive a second setup request from a second core network device or a second service application server, where the second setup request carries a service requirement of a second service, and the service requirement of the second service is used to indicate, to the access network device, a radio channel quality requirement for the UE to execute the second service. The determining module is further configured to determine that the service requirement of the second service is higher than the service requirement of the first service. The sending module is further configured to deliver a second measurement control command to the UE. The second measurement control command is used to indicate the UE to measure the radio channel quality of the first cell, and send a second measurement report to the access network device when the radio channel quality of the first cell does not satisfy the service requirement of the second service, and the second measurement report is used to indicate, to the access network device, that the radio channel quality of the first cell does not satisfy the service requirement of the second service.

In a possible implementation, the sending module is further configured to: if the determining module determines that the second cell or the third cell whose radio channel quality satisfies the service requirement of the first service does not exist, send a second notification message to the first core network device or the first service application server. The second notification message is used to notify the first core network device or the first service application server that the radio channel quality of the first cell does not satisfy the service requirement of the first service and the second cell or the third cell whose radio channel quality satisfies the service requirement of the first service does not exist.

In a possible implementation, the access network device may further include a deletion module. The deletion module is configured to: if the determining module determines that the second cell or the third cell whose radio channel quality satisfies the service requirement of the first service does not exist, delete the radio resource allocated to the first service.

In a possible implementation, the receiving module is further configured to: after the sending module sends the first notification message or the second notification message to the first core network device or the first service application server, receive a first service modification request from the first core network device or the first service application server, where the first service modification request carries an updated service requirement of the first service.

In a possible implementation, a fourth cell is the second cell or the third cell. The determining module is specifically configured to: deliver a third measurement control command to the UE, where the third measurement control command is used to indicate the UE to measure radio channel quality of the fourth cell, receive a third measurement report reported by the UE, where the third measurement report carries a measurement result obtained after the UE measures the radio channel quality of the fourth cell, and determine, based on the measurement result, that the fourth cell whose radio channel quality satisfies the service requirement of the first service exists; or deliver a third measurement control command to the UE, where the third measurement control command carries a measurement report condition determined based on the service requirement of the first service, the third measurement control command is used to indicate the UE to measure radio channel quality of the fourth cell, and the measurement report condition is used to indicate the UE to: report a third measurement report to the access network device when the UE determines that the radio channel quality of the fourth cell satisfies the measurement report condition, and if the third measurement report reported by the UE is received, determine that the fourth cell whose radio channel quality satisfies the service requirement of the first service exists.

In a possible implementation, the determining module is specifically configured to: if the radio channel quality of the first cell satisfies radio channel quality required by at least one type of codec information in a codec information list of the UE but the radio channel quality of the first cell does not satisfy radio channel quality required by codec information of the first service, determine that the radio channel quality of the first cell does not satisfy the service requirement of the first service.

In a possible implementation, the determining module is further configured to: after determining that the radio channel quality of the first cell satisfies the radio channel quality required by at least one type of codec information in the codec information list of the UE, determine recommended codec information.

In a possible implementation, the first network is either of a 5G network and a 4G network. The second network is any one of a 4G network, a 3G network, and a 2G network.

It should be noted that for detailed descriptions of the service requirement of the first service, the updated service requirement of the first service, the radio channel requirement of the first service, the codec information of the first service, the radio channel quality, the terminal type information of the UE, the first network, the second network, the first indication information, the second indication information, the third indication information, the first notification message, the second notification message, and the information carried in the first notification message and the second notification message in the third aspect and the possible implementations of the third aspect of the embodiments of this application, reference may be made to the related descriptions in the possible implementations of the first aspect of the embodiments of this application, and details are not described in this embodiment of this application again.

According to a fourth aspect, an access network device is provided. The access network device includes one or more processors, a memory, a bus system, a transmitter, a receiver, and one or more application programs. The one or more processors, the memory, the transmitter, and the receiver are connected by using the bus system. The one or more application programs are stored in the memory, the one or more application programs include an instruction, and when the processor of the access network device executes the instruction, the access network device performs the service setup method in the first aspect and the possible implementations of the first aspect.

According to a fifth aspect, a computer readable storage medium is provided. The computer readable storage medium stores one or more programs, the one or more programs include an instruction, and when a processor of an access network device executes the instruction, the access network device performs the service setup method in the first aspect and the possible implementations of the first aspect.

It should be noted that function modules of the access network device in the third aspect, the fourth aspect, and the possible implementations of the third aspect and the fourth aspect are obtained by performing function division on the access network device to implement the service setup method in the first aspect and the possible implementations of the first aspect. For specific descriptions and effect analysis of functions implemented by the function modules in the third aspect, the fourth aspect, and the possible implementations of the third aspect and the fourth aspect, refer to the detailed descriptions in the first aspect and the possible implementations of the first aspect, and details are not described in this embodiment of this application again.

According to a sixth aspect, a service application server is provided. The service application server includes a sending module and a receiving module. The sending module is configured to send a first setup request to an access network device, where the first setup request carries a service requirement of a first service, and the service requirement of the first service is used to indicate, to the access network device, a radio channel quality requirement for UE to execute the first service. The receiving module is configured to receive a first setup response from the access network device, where the first setup response is used to notify the service application server that the access network device accepts the first setup request. The receiving module is further configured to receive a first notification message from the access network device, where the first notification message is used to notify the service application server that radio channel quality of a first cell of a first network in which the UE is located does not satisfy the service requirement of the first service. Alternatively, the receiving module is further configured to receive a second notification message from the access network device, where the second notification message is used to notify the service application server that radio channel quality of a first cell of a first network in which the UE is located does not satisfy the service requirement of the first service, the second notification message is used to notify a first core network device or a first service application server that the radio channel quality of the first cell does not satisfy the service requirement of the first service and a second cell or a third cell whose radio channel quality satisfies the service requirement of the first service does not exist, the second cell is located in the first network, and the third cell is located in a second network.

In a possible implementation, the determining module is further configured to: before the sending module sends the first setup request to the access network device, determine the service requirement of the first service based on at least one of a MOS requirement of the first service, the radio channel quality of the first cell, terminal type information of the UE, information about a radio frequency accessed by the UE, location information of the UE, codec information of the first service, load information of the first cell, radio access technology RAT information of the first network, and bandwidth information of the first service. Alternatively, the determining module is further configured to: before the sending module sends the first setup request to the access network device, send a first query request to a third-party network device, where the first query request carries at least one of a MOS requirement of the first service, the radio channel quality of the first cell, terminal type information of the UE, information about a carrier frequency accessed by the UE, location information of the UE, codec information of the first service, load information of the first cell, RAT information of the first network, and bandwidth information of the first service; and receive a first query response from the third-party network device, where the first query response carries the service requirement of the first service.

In a possible implementation, the sending module is further configured to: before the determining module determines the service requirement of the first service, send a second query request to the first core network, the UE, or the access network device. The receiving module is further configured to receive a second query response from the first core network, the UE, or the access network device, where the second query response carries at least one of the radio channel quality of the first cell, the terminal type information of the UE, the information about the carrier frequency accessed by the UE, the location information of the UE, the codec information of the first service, the load information of the first cell, the RAT information of the first network, and the bandwidth information of the first service.

In a possible implementation, the receiving module is further configured to: before the determining module determines the service requirement of the first service, receive a first message from the UE, where the first message carries at least one of the radio channel quality of the first cell, the terminal type information of the UE, the information about the carrier frequency accessed by the UE, the location information of the UE, the codec information of the first service, the load information of the first cell, the RAT information of the first network, and the bandwidth information of the first service.

In a possible implementation, the determining module is further configured to: after the receiving module receives the first notification message or the second notification message from the access network device, determine an updated service requirement of the first service based on at least one of the MOS requirement of the first service, and the radio channel quality of the first cell, the terminal type information of the UE, the information about the carrier frequency accessed by the UE, the location information of the UE, the codec information of the first service, the load information of the first cell, the RAT information of the first network, the bandwidth information of the first service, and recommended codec information that are carried in the first notification message or the second notification message. Alternatively, the determining module is further configured to: after the receiving module receives the first notification message or the second notification message from the access network device, send a third query request to the third-party network device, where the third query request carries at least one of the MOS requirement of the first service, and the radio channel quality of the first cell, the terminal type information of the UE, the information about the carrier frequency accessed by the UE, the location information of the UE, the codec information of the first service, the load information of the first cell, the RAT information of the first network, the bandwidth information of the first service, and recommended codec information that are carried in the first notification message or the second notification message; and receive a third query response from the third-party network device, where the first query response carries an updated service requirement of the first service.

In a possible implementation, the sending module is further configured to: after the determining module determines the updated service requirement of the first service, send a first service modification request to the access network device, where the first service modification request carries the updated service requirement of the first service.

In a possible implementation, the service application server may further include a termination module. The termination module is configured to: after the receiving module receives the first notification message or the second notification message from the access network device, determine, based on at least one of the radio channel quality of the first cell, the terminal type information of the UE, the information about the carrier frequency accessed by the UE, the location information of the UE, the codec information of the first service, the load information of the first cell, the RAT information of the first network, the bandwidth information of the first service, and the recommended codec information that are carried in the first notification message or the second notification message, to terminate the first service. The sending module is further configured to send a first service deletion message to the access network device or the UE, where the first service deletion message is used to indicate the access network device or the UE to terminate the first service.

In a possible implementation, the sending module is specifically configured to: deliver a first setup request to the access network device by using the core network device; or deliver a first setup request to the access network device by using an interface between the service application server and the access network device.

In a possible implementation, the sending module is further configured to send a second message to the UE. The second message is used to indicate that the codec information of the first service is changed from first codec information to second codec information.

In a possible implementation, the determining module is further configured to determine that a radio channel requirement corresponding to the first codec information is higher than a radio channel requirement corresponding to the second codec information.

It should be noted that for detailed descriptions of the service requirement of the first service, the updated service requirement of the first service, the radio channel requirement of the first service, the codec information of the first service, the radio channel quality, the terminal type information of the UE, the first network, the second network, first indication information, second indication information, third indication information, the first notification message, the second notification message, and the information carried in the first notification message and the second notification message in the sixth aspect and the possible implementations of the sixth aspect of the embodiments of this application, reference may be made to the related descriptions in the possible implementations of the first aspect of the embodiments of this application, and details are not described in this embodiment of this application again.

According to a seventh aspect, a service application server is provided. The service application server includes one or more processors, a memory, a bus system, a transmitter, a receiver, and one or more application programs. The one or more processors, the memory, the transmitter, and the receiver are connected by using the bus system. The one or more application programs are stored in the memory, the one or more application programs include an instruction, and when the processor of the service application server executes the instruction, the service application server performs the service setup method in the second aspect and the possible implementations of the second aspect.

According to an eighth aspect, a computer readable storage medium is provided. The computer readable storage medium stores one or more programs, the one or more programs include an instruction, and when a processor of the service application server executes the instruction, the service application server performs the service setup method in the second aspect and the possible implementations of the second aspect.

It should be noted that function modules of the service application server in the sixth aspect, the seventh aspect, and the possible implementations of the sixth aspect and the seventh aspect are obtained by performing function division on the service application server to implement the service setup method in the second aspect and the possible implementations of the second aspect. For specific descriptions and effect analysis of functions implemented by the function modules in the sixth aspect, the seventh aspect, and the possible implementations of the sixth aspect and the seventh aspect, refer to the detailed descriptions in the second aspect and the possible implementations of the second aspect, and details are not described in this embodiment of this application again.

BRIEF DESCRIPTION OF DRAWINGS

To describe the technical solutions of the embodiments of this application more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

In the specification, claims, and accompanying drawings of this application, the terms "first", "second", and the like are intended to distinguish between different objects but do not indicate a particular order. In addition, the terms "including", "comprising", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The technical solutions of this application may be applied to a 2G network, a 3G network, a 4G network, and a 5G network. The technical solutions of this application are not only applicable to a VoLTE service and a video call service, but also applicable to another service having a similar requirement on network signal coverage. This application does not limit a service type of user equipment and a network in which the user equipment is located.

Figure 1:
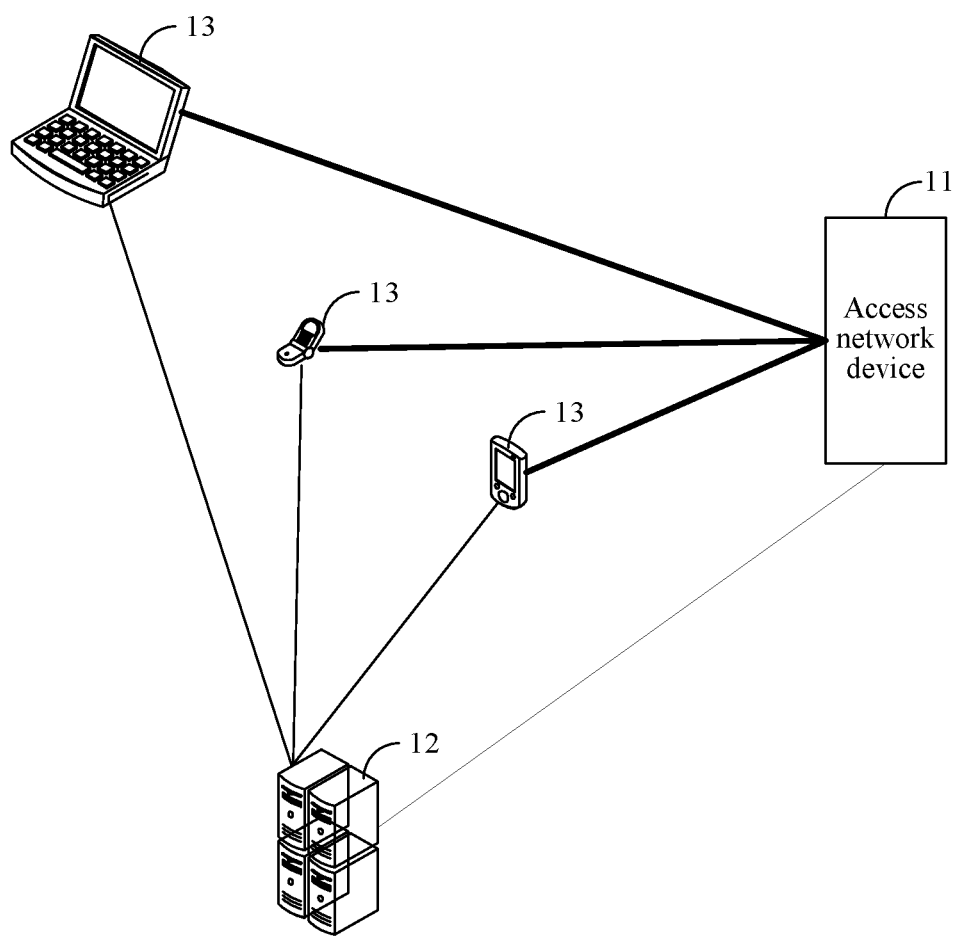
FIG. 1 is a schematic diagram of a network architecture of a communications network according to an embodiment of this application.

Referring to FIG. 1, FIG. 1 is a schematic diagram of a network architecture of a communications network according to an embodiment of this application. As shown in FIG. 1, the communications network may include an access network device 11, a service application server 12, and at least one user equipment (UE) 13. The access network device 11 may be connected to the UE 13 by using a wireless communications link. The service application server 12 is responsible for processing a service registration request, subscriber management, session control, service switching, service control, and the like of the UE. There may be another core network device between the access network device 11 and the service application server 12, and the core network device is responsible for connecting a service between the UE 13 and the service application server 12.

Figure 2:
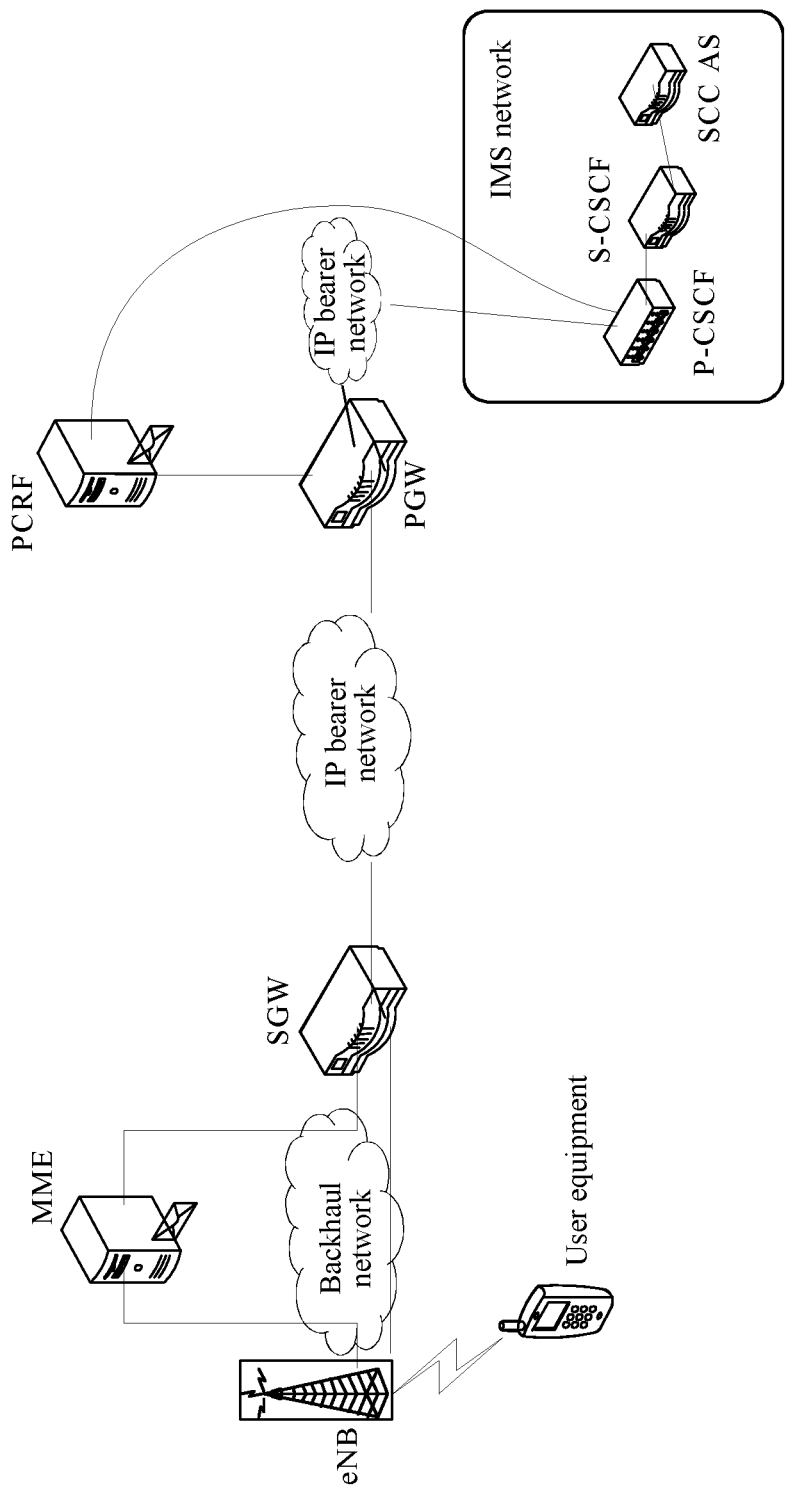
FIG. 2 is a schematic diagram of a network architecture of another communications network according to an embodiment of this application.

As shown in FIG. 2, FIG. 2 shows an example in which the network architecture of the communications network shown in FIG. 1 is specifically a 4G network. An evolved NodeB (eNB) in FIG. 2 is used as the access network device in FIG. 1, and the eNB may be in a communication connection to UE (to be specific, the UE 13 in FIG. 1) by using a radio link. A core network device in an LTE network of the network architecture shown in FIG. 2 may include a mobility management entity (MME), a serving gateway (SGW), a packet data network gateway (PGW), a policy and charging rules function (PCRF) entity, or the like. The core network device may be responsible for connecting a VoLTE service and the like of the UE to an Internet Protocol Multimedia Subsystem (IMS) network, and be responsible for transmitting signaling related to a VoLTE call and the like between the UE and the IMS network. In addition, the core network device may be further responsible for creating a related dedicated bearer (for example, a quality of service class identifier (QCI)=1), to transmit user plane data (media data) related to the VoLTE service.

An IMS network device shown in FIG. 2, for example, a proxy call session control function (P-CSCF) entity, an interrogating/serving call session control function (S-CSCF) entity, or a service centralization and continuity application server (SCC AS), may be used as any service application server in the embodiments of this application.

The P-CSCF entity (which may be classified into a calling P-CSCF entity and a called P-CSCF entity) is a first contact point when the UE accesses the IMS network in a process of a VoLTE service or the like, and may be responsible for acting as a proxy of processing signaling related to the VoLTE service and the like, and implementing route control. The S-CSCF entity (which may be classified into a calling S-CSCF entity and a called S-CSCF entity) is a service switching center of the IMS network. The S-CSCF entity may be mainly responsible for receiving and processing the service registration request, subscriber management, session control, service switching, service control, Session Initiation Protocol (SIP) message processing and charging, and the like of the UE. The SCC AS (which may be classified into a calling SCC AS and a called SCC AS) is configured to play a role of keeping service continuity when the UE moves between the LTE network and another network.

The UE in this embodiment of this application may be a wireless terminal or a wired terminal. For example, the UE may be a mobile phone, a computer, a tablet computer, a personal digital assistant (PDA), a mobile Internet device (MID), a wearable device, or an e-book reader.

Some technical solutions of the embodiments of this application may be specifically implemented based on the communications network architecture shown in FIG. 1 or a variant architecture of the communications network architecture.

Figure 3:
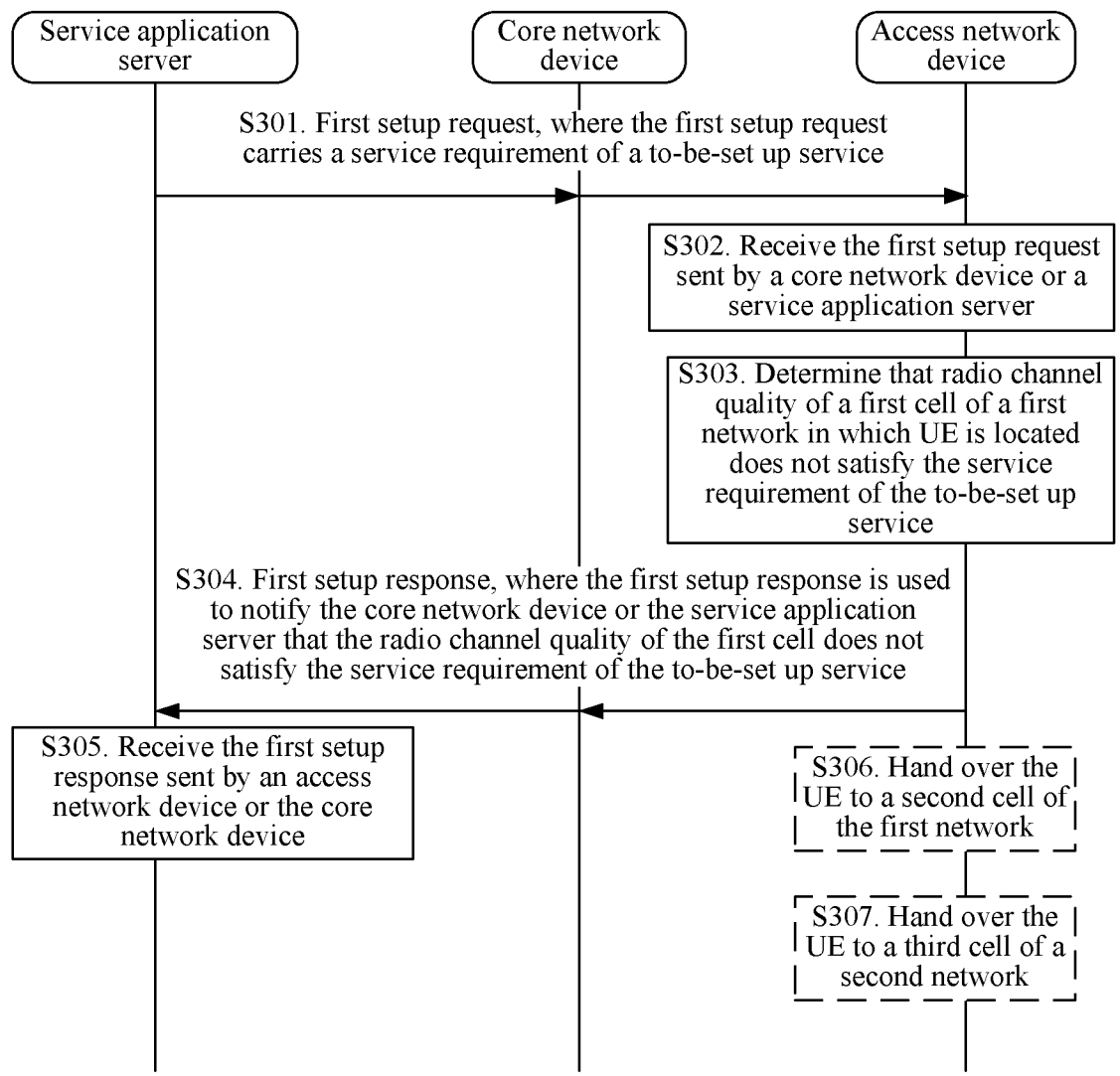
FIG. 3 is a flowchart of a service setup method according to an embodiment of this application.

An embodiment of this application provides a service setup method. As shown in FIG. 3, the service setup method includes the following steps.

S301. A service application server sends a first setup request to an access network device or a core network device, where the first setup request carries a service requirement of a to-be-set up service.

The service requirement of the to-be-set up service is used to indicate, to the access network device or the core network device, a radio channel quality requirement required for UE to execute the to-be-set up service.

It should be noted that the service application server in this embodiment of this application is a service application server in an IMS network, for example, any one of or an integration of at least two of P-CSCF, ATCF, S-CSCF, and an SCC AS.

It may be figured out that the first setup request may be delivered by the service application server to the access network device after the service application server receives a request message of setting up the to-be-set up service for the UE. The to-be-set up service may be a VoLTE service, a video service, or a service of another service type.

For example, the to-be-set up service is a VoLTE service, the service application server (for example, the P-CSCF, the ATCF, the S-CSCF, or the SCC AS) may send a service setup request message (to be specific, the first setup request) to the access network device (for example, an eNB) after receiving an invite message of setting up the VoLTE service for the UE. The first setup request is used to request the access network device (for example, the eNB) to allocate a radio network resource to the VoLTE service. The UE may be calling UE, and correspondingly, the service application server is a calling service application server. Alternatively, the UE may be called UE, and correspondingly, the service application server is a called service application server.

For example, the service application server may send the first setup request to the access network device by using either of the following two implementations.

Manner 1: The service application server delivers the first setup request to the access network device by using the core network device.

For example, using a VoLTE service as an example, after receiving an invite (message of setting up the VoLTE service for the UE, the service application server may send an authentication authorization request to the PCRF, to trigger an evolved packet system (EPS) core network device to initiate a process of creating a voice dedicated bearer. The authentication authorization request includes service requirement information of the VoLTE service. The EPS core network device may send a request message of creating the voice dedicated bearer to the access network device. The request message of creating the voice dedicated bearer includes the service requirement information of the VoLTE service.

Manner 2: The service application server delivers the first setup request to the access network device by using an interface between the service application server and the access network device.

The interface between the service application server and the access network device may be a private interface disposed by a device manufacturer between the service application server and the access network device. The service application server may directly deliver the first setup request (for example, the setup request of the VoLTE service) to the access network device by using the private interface. The first setup request carries the service requirement of the to-be-set up service. A related request message (for example, the first setup request) from using the private interface may be carried in an extension field of the header of a Real-Time Transport Protocol (RTP) flow data packet.

For example, the service requirement of the to-be-set up service may include at least one of service type indication information of the to-be-set up service, a radio channel requirement of the to-be-set up service, codec information of the to-be-set up service, a codec information list of the UE, and terminal type information of the UE, and the codec information list of the UE includes codec information supported by both the UE and the service application server.

The radio channel requirement of the to-be-set up service may include at least one of a reference signal received power (RSRP) requirement, a reference signal received quality (RSRQ) requirement, and a signal to interference plus noise ratio (SINR) requirement.

The codec information of the to-be-set up service includes codec type information of the to-be-set up service and codec rating set information of the to-be-set up service.

The terminal type information of the UE includes at least one of an international mobile equipment identity (IMEI) of the UE, a type approval code (TAC) of the IMEI, and an international mobile subscriber identity (IMSI) of the UE.

S302. The access network device receives the first setup request from the core network device or the service application server.

It may be figured out that if the service application server sends the first setup request to the access network device by using the foregoing manner 1, the access network device may receive, by using the core network device, the first setup request from the service application server; or if the service application server sends the first setup request to the access network device by using the foregoing manner 2, the access network device may directly receive, by using the private interface between the service application server and the access network device, the first setup request from the service application server.

S303. The access network device determines that radio channel quality of a first cell of a first network in which UE is located does not satisfy the service requirement of the to-be-set up service.

For example, the first network in this embodiment of this application may be either of a 5G network and a 4G network.

After receiving the first setup request, the access network device may determine whether the radio channel quality of the first cell satisfies the service requirement of the to-be-set up service. If determining that the radio channel quality of the first cell satisfies the service requirement of the to-be-set up service, the access network device may allocate a radio resource to the to-be-set up service. Alternatively, if determining that the radio channel quality of the first cell does not satisfy the service requirement of the to-be-set up service, the access network device may continue to perform S304 and S305, or S306, or S307.

For example, after receiving the first setup request carrying the service requirement of the to-be-set up service, the access network device may obtain the radio channel requirement of the to-be-set up service based on the service requirement of the to-be-set up service, and then compare the radio channel quality of the first cell with the service requirement based on the obtained radio channel requirement of the to-be-set up service, to determine whether the radio channel quality of the first cell satisfies the service requirement of the to-be-set up service.

For example, assuming that the service requirement of the to-be-set up service includes the service type indication information of the to-be-set up service, the access network device may determine, based on the service type indication information, a specific service type of the to-be-set up service (for example, the to-be-set up service is a VoLTE service, a video service, or a service of another type). Then, the access network device may determine a radio channel requirement (for example, an RSRP requirement, an RSRQ requirement, or an SINR requirement) of the to-be-set up service based on the service type of the to-be-set up service and a preconfigured correspondence between a service type and a radio channel requirement. For another example, assuming that the service requirement of the to-be-set up service includes the codec information of the to-be-set up service, the access network device may determine, based on the codec information of the to-be-set up service, a radio channel requirement corresponding to the codec information of the to-be-set up service.

It may be figured out that the access network device may determine, based on that an uplink and/or downlink radio channel quality parameter of the first cell in which the UE is located cannot satisfy the radio channel requirement of the to-be-set up service, that the radio channel quality of the first cell of the first network in which the UE is located cannot satisfy the service requirement of the to-be-set up service.

For example, the uplink and/or downlink channel quality parameter may include at least one of an uplink and/or downlink RSRP, an uplink and/or downlink SINR, and an uplink and/or downlink RSRQ. For example, if the uplink and/or downlink RSRP is lower than the RSRP requirement, the uplink and/or downlink RSRQ is lower than the RSRQ requirement of the to-be-set up service, and the uplink and/or downlink SINR is lower than the SINR requirement of the to-be-set up service, the access network device may determine that the radio channel quality of the first cell cannot satisfy the service requirement of the to-be-set up service.

For example, in an application scenario of this embodiment of this application, the service requirement of the to-be-set up service may include the codec information of the to-be-set up service and the codec information list of the UE. The codec information list of the UE includes the codec information supported by both the UE and the service application server.

In this application scenario, the "determining, by the access network device, that radio channel quality of a first cell of a first network in which UE is located does not satisfy the service requirement of the to-be-set up service" in S303 may specifically include: determining, by the access network device, that the radio channel quality of the first cell satisfies radio channel quality required by at least one type of codec information in the codec information list of the UE but the radio channel quality of the first cell does not satisfy radio channel quality required by the codec information of the to-be-set up service.

S304. The access network device sends a first setup response to the core network device or the service application server, where the first setup response is used to notify the core network device or the service application server that the radio channel quality of the first cell does not satisfy the service requirement of the to-be-set up service.

The first setup response carries at least one of the radio channel quality of the first cell, the terminal type information of the UE, information about a carrier frequency accessed by the UE, location information of the UE, load information of the first cell, RAT information of the first network, recommended codec information, and bandwidth information of the to-be-set up service. It may be figured out that after determining that the radio channel quality of the first cell satisfies the radio channel quality required by at least one type of codec information in the codec information list of the UE, the access network device may determine the recommended codec information. The recommended codec information may be codec information that is selected by the access network device from the codec information list of the UE and that is supported by both the UE and the service application server, and the recommended codec information is one piece of codec information in codec information supported by the first cell.

The location information of the UE includes at least one of a cell identity of the UE, a base station identity of the UE, a TAI of the UE, an LAI of the UE, and an RAI of the UE.

S305. The service application server receives the first setup response from the access network device or the core network device.

S306. The access network device hands over the UE to a second cell of the first network.

S307. The access network device hands over the UE to a third cell of a second network.

The access network device may attempt to hand over the UE to the second cell of the first network or the third cell of the second network when the radio channel quality of the first cell does not satisfy the service requirement of the to-be-set up service.

For example, the second network is any one of a 4G network, a 3G network, and a 2G network. For example, when the first network is a 5G network, the second network may be any one of a 4G network, a 3G network, and a 2G network. Alternatively, when the first network is a 4G network, the second network may be a 3G network or a 2G network. The first cell and the second cell in this embodiment of this application are different cells of the first network.

In the service setup method provided in this embodiment of this application, in a process of setting up a service for the UE, the service application server may deliver corresponding service requirement information to the access network device depending on a service demand and a real-time status. Correspondingly, the access network device may use the received service requirement information as an admission threshold of service setup. To be specific, when radio signal quality of the cell in which the UE is located does not satisfy the service requirement, the access network device notifies the service application server, so that the service application server makes a corresponding adjustment. Alternatively, the access network device may hand over the UE to another cell that can satisfy the service requirement, to complete service setup in the another cell. By using this solution, the access network device may use, as an admission threshold of service setup, the service requirement that is of the to-be-set up service and that is from the service application server, thereby avoiding problems such as an error and inflexibility caused by determining an admission threshold only based on an empirical value. In addition, for a scenario in which the signal quality of the cell of the UE does not reach the admission threshold (to be specific, a scenario in which the radio channel quality of the first cell does not satisfy the service requirement of the to-be-set up service), for example, a coverage area in which a network signal is weak, a network side may adjust the service requirement depending on an actual network status, or hand over the UE to another cell, to ensure that after a service is set up, the service can be normally executed and user experience during the execution of the service is improved.

In an implementation of this embodiment of this application, the service application server may indicate, by using indication information (for example, first indication information, second indication information, or third indication information) included in the service requirement of the to-be-set up service, the access network device to: directly reply to the service application server with the first setup response or hand over the UE to another cell when the radio channel quality of the first cell does not satisfy the service requirement of the to-be-set up service, to be specific, indicate the access network device to: determine to perform one of S304, S306, or S307 when the radio channel quality of the first cell does not satisfy the service requirement of the to-be-set up service.

Figure 4:
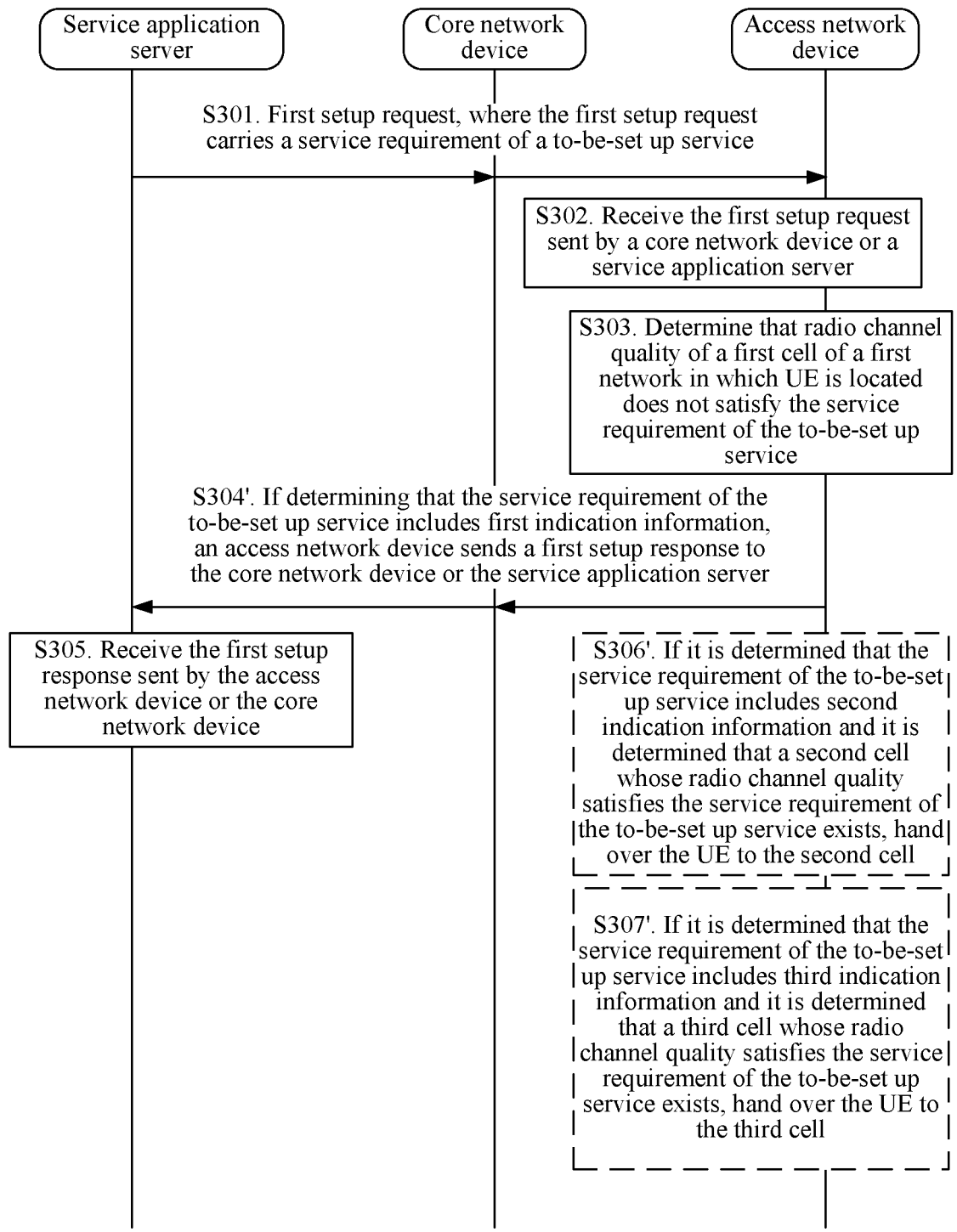
FIG. 4 is a flowchart of another service setup method according to an embodiment of this application.

Specifically, when the service requirement of the to-be-set up service includes the first indication information, because the first indication information is used to indicate the access network device to: send the first setup response to the core network device or the service application server when the radio channel quality of the first cell does not satisfy the service requirement of the to-be-set up service, the access network device may directly send the first setup response to the core network device or the service application server when the radio channel quality of the first cell does not satisfy the service requirement of the to-be-set up service. Specifically, as shown in FIG. 4, S304 in FIG. 3 may be replaced with S304'.

S304'. If determining that the service requirement of the to-be-set up service includes first indication information, the access network device sends a first setup response to the core network device or the service application server.

When the service requirement of the to-be-set up service includes the second indication information, because the second indication information is used to indicate the access network device to: hand over the UE to the second cell when the radio channel quality of the first cell does not satisfy the service requirement of the to-be-set up service, the access network device may hand over the UE to the second cell of the first network when the radio channel quality of the first cell does not satisfy the service requirement of the to-be-set up service. Specifically, as shown in FIG. 4, S306 in FIG. 3 may be replaced with S306'.

S306'. If the access network device determines that the service requirement of the to-be-set up service includes second indication information and the access network device determines that a second cell whose radio channel quality satisfies the service requirement of the to-be-set up service exists, the access network device hands over the UE to the second cell.

When the service requirement of the to-be-set up service includes the third indication information, because the third indication information is used to indicate the access network device to: hand over the UE to the third cell when the radio channel quality of the first cell does not satisfy the service requirement of the to-be-set up service, the access network device may hand over the UE to the third cell when the radio channel quality of the first cell does not satisfy the service requirement of the to-be-set up service. Specifically, as shown in FIG. 4, S307 in FIG. 3 may be replaced with S307'.

S307'. If the access network device determines that the service requirement of the to-be-set up service includes third indication information and the access network device determines that a third cell whose radio channel quality satisfies the service requirement of the to-be-set up service exists, the access network device hands over the UE to the third cell.

It may be figured out that before handing over the UE to the second cell or the third cell, the access network device may determine that the second cell or the third cell whose radio channel quality satisfies the service requirement of the to-be-set up service exists.

In this embodiment of this application, the determining that the second cell or the third cell whose radio channel quality satisfies the service requirement of the to-be-set up service exists is described by using an example in which the access network device determines that the second cell whose radio channel quality satisfies the service requirement of the to-be-set up service exists.

Manner 1: The access network device may deliver a measurement control command to the UE. The measurement control command is used to indicate the UE to measure the radio channel quality of the second cell. The access network device receives a measurement report reported by the UE. The measurement report carries a measurement result obtained after the UE measures the radio channel quality of the second cell. The measurement result may include a radio channel quality parameter of the second cell, and the access network device may determine, based on the measurement result, that the second cell whose radio channel quality satisfies the service requirement of the to-be-set up service exists. Alternatively, the measurement result may be indication information indicating that the second cell whose radio channel quality satisfies the service requirement of the to-be-set up service exists, and the access network device may directly determine, based on an indication of the measurement result, that the second cell whose radio channel quality satisfies the service requirement of the to-be-set up service exists.

Manner 2: The access network device delivers a measurement control command to the UE. The measurement control command carries a measurement report condition determined based on the service requirement of the to-be-set up service. The measurement control command is used to indicate the UE to measure the radio channel quality of the second cell, and the measurement report condition is used to indicate the UE to: report a measurement report to the access network device when the UE determines that the radio channel quality of the second cell satisfies the measurement report condition. If the access network device receives the measurement report reported by the UE, the access network device determines that the second cell whose radio channel quality satisfies the service requirement of the to-be-set up service exists.

It should be noted that a method for determining, by the access network device, that the third cell whose radio channel quality satisfies the service requirement of the to-be-set up service exists is similar to a method for determining, by the access network device, that the second cell whose radio channel quality satisfies the service requirement of the to-be-set up service exists, and details are not described in this embodiment of this application again.

Figure 5:
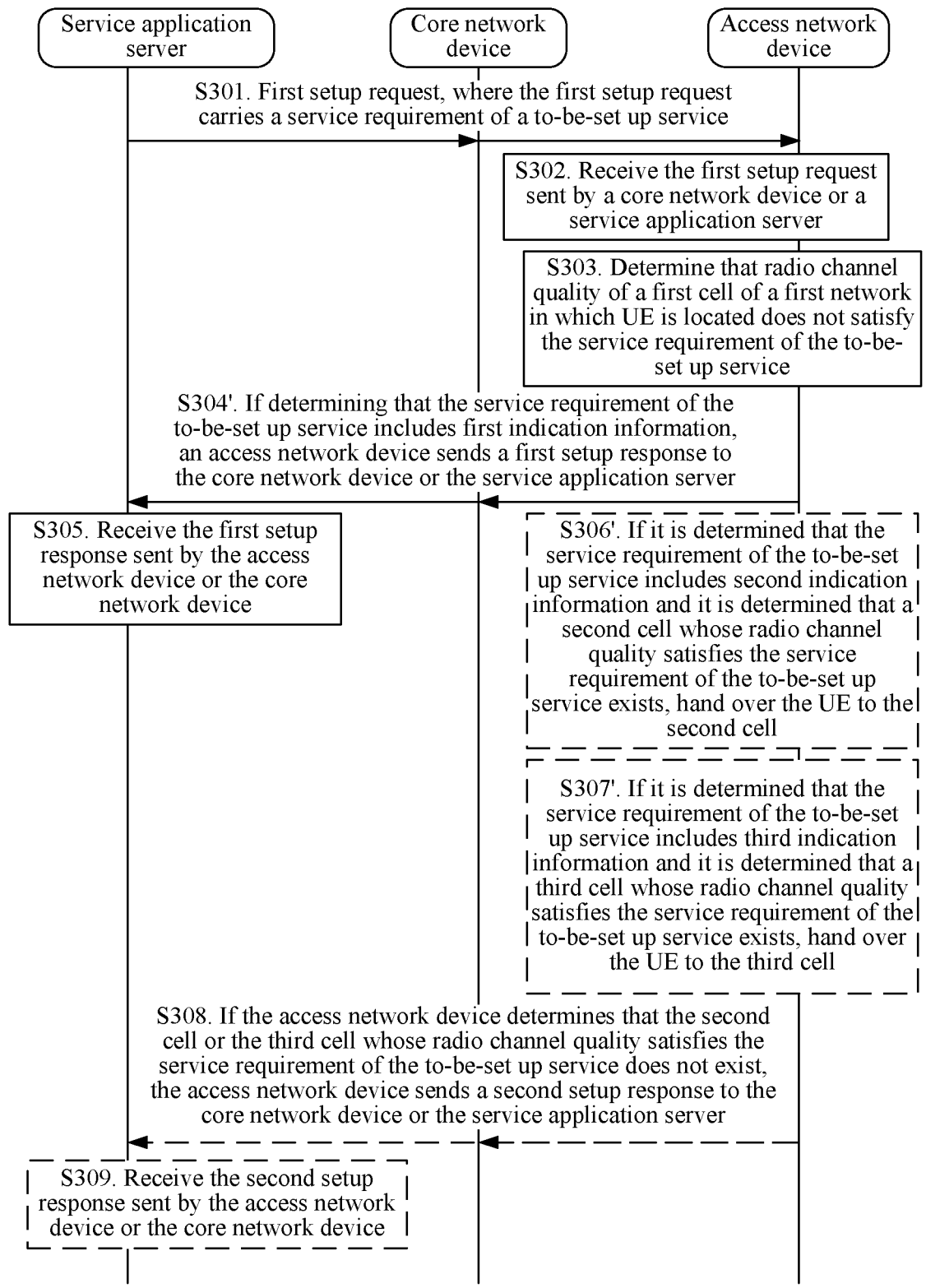
FIG. 5 is a flowchart of another service setup method according to an embodiment of this application.

Further, when the second cell or the third cell whose radio channel quality satisfies the service requirement of the to-be-set up service does not exist, as shown in FIG. 5, the method in this embodiment of this application may further include S308 and S309.

S308. If the access network device determines that the second cell or the third cell whose radio channel quality satisfies the service requirement of the to-be-set up service does not exist, the access network device sends a second setup response to the core network device or the service application server.

The second setup response is used to notify the core network device or the service application server that the radio channel quality of the first cell does not satisfy the service requirement of the to-be-set up service and the second cell or the third cell whose radio channel quality satisfies the service requirement of the to-be-set up service does not exist.

It should be noted that a method for sending, by the access network device, the second setup response to the core network device or the service application server is similar to a method for sending, by the access network device, the first setup response to the core network device or the service application server, and details are not described in this embodiment of this application again.

S309. The service application server receives the second setup response from the access network device or the core network device.

The second setup response carries at least one of the radio channel quality of the first cell, the terminal type information of the UE, the information about the carrier frequency accessed by the UE, the location information of the UE, the load information of the first cell, the RAT information of the first network, the recommended codec information, and the bandwidth information of the to-be-set up service.

Figure 6:
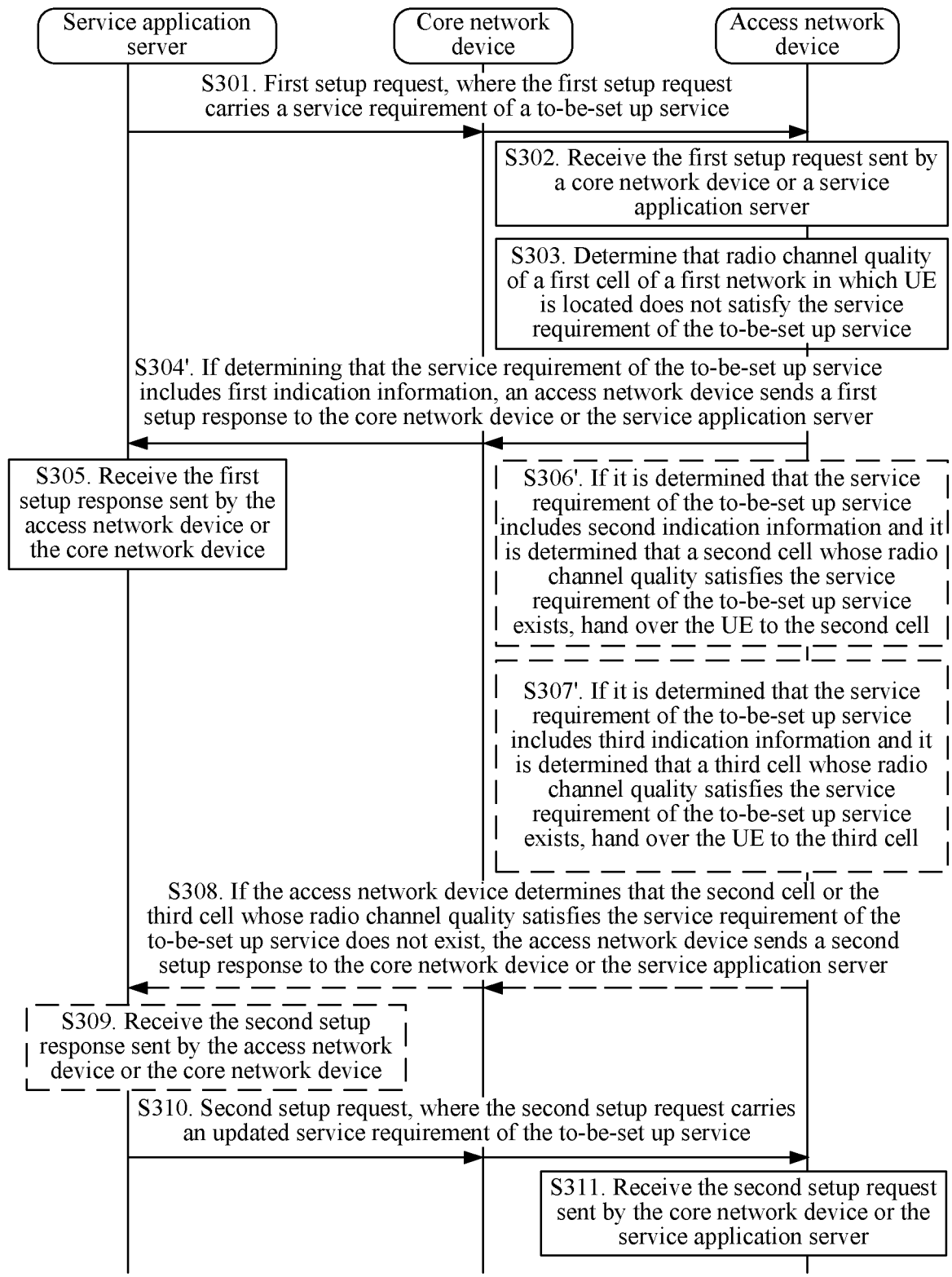
FIG. 6 is a flowchart of another service setup method according to an embodiment of this application.

At least one of the radio channel quality of the first cell, the terminal type information of the UE, the information about the carrier frequency accessed by the UE, the location information of the UE, the load information of the first cell, the RAT information of the first network, the recommended codec information, and the bandwidth information of the to-be-set up service that are carried in the first setup response or the second setup response may be used by the service application server to update the to-be-set up service. After receiving the first setup response or the second setup response, the service application server may determine that the radio channel quality of the first cell does not satisfy the service requirement of the to-be-set up service, so that a second setup request carrying an updated service requirement of the to-be-set up service may be sent to the access network device. Specifically, as shown in FIG. 6, after S305 or S309 shown in FIG. 5, the method in this embodiment of this application may further include S310 and S311.

S310. The service application server sends a second setup request to the access network device or the core network device, where the second setup request carries an updated service requirement of the to-be-set up service.

It should be noted that a method for sending, by the service application server, the second setup request to the access network device or the core network device is similar to a method for sending, by the service application server, the first setup request to the access network device or the core network device, and details are not described in this embodiment of this application again.

S311. The access network device receives the second setup request from the core network device or the service application server.

It should be noted that a method for receiving, by the access network device, the second setup request from the core network device or the service application server is similar to a method for receiving, by the access network device, the first setup request from the core network device or the service application server, and details are not described in this embodiment of this application again.

It may be figured out that after receiving the second setup request, the access network device may determine whether the radio channel quality of the first cell satisfies the updated service requirement of the to-be-set up service carried in the second setup request. For a method for determining, by the access network device, whether the radio channel quality of the first cell satisfies the updated service requirement of the to-be-set up service, refer to the method for determining, by the access network device, whether the radio channel quality of the first cell satisfies the service requirement of the to-be-set up service, and details are not described in this embodiment of this application again.

For example, in this embodiment of this application, the codec information of the to-be-set up service included in the service requirement of the to-be-set up service is first codec information, and updated codec information of the to-be-set up service included in the updated service requirement of the to-be-set up service is second codec information. The service application server may determine that the codec information of the to-be-set up service is the first codec information and the updated codec information of the to-be-set up service is the second codec information, and change the codec information of the to-be-set up service from the first codec information to the second codec information. Specifically, the service application server may determine, when sending the second setup request, that the updated codec information of the to-be-set up service is the second codec information. The service application server may further send a second message to the UE, and the second message is used to indicate that the codec information of the to-be-set up service is changed from the first codec information to the second codec information.

It may be figured out that the service application server may change the codec information of the to-be-set up service from the first codec information to the second codec information when determining that a radio channel requirement corresponding to the first codec information is higher than a radio channel requirement corresponding to the second codec information, and send the second message to the UE. Further, the first codec information and the second codec information may be a same type of codec, but use different codec rating sets. For example, both the first codec information and the second codec information are EVS codec, but a codec rating set of the first codec information is an EVS full rating set, and a codec rating set of the second codec information is an EVS VBR mode.

Further, before sending the first setup request carrying the service requirement of the to-be-set up service to the access network device, the service application server may determine the service requirement of the to-be-set up service. Specifically, before S301 shown in any one of FIG. 3 to FIG. 6, the method in this embodiment of this application may further include S401, or S402 to S405.

S401. The service application server determines the service requirement of the to-be-set up service based on at least one of a mean opinion score (MOS) of the to-be-set up service, the radio channel quality of the first cell, terminal type information of the UE, information about a carrier frequency accessed by the UE, location information of the UE, codec information of the to-be-set up service, load information of the first cell, RAT information of the first network, and bandwidth information of the to-be-set up service.

For example, the service application server may store a correspondence between an MOS or "at least one of radio channel quality of a cell in which a terminal is located, terminal type information of the terminal, information about a carrier frequency accessed by the terminal, location information of the UE, codec information of a service, load information of the cell in which the terminal is located, RAT information of a network in which the terminal is located, and bandwidth information of the service" and a service requirement of the service. The correspondence is obtained by the service application server through statistics collection by using big data. In this way, the service application server may query the correspondence based on the MOS requirement of the to-be-set up service, or "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service", to determine the service requirement of the to-be-set up service.

When the service application server does not store the correspondence, a third-party network device storing the correspondence may determine the service requirement of the to-be-set up service. Specifically, the method in this embodiment of this application may further include S402 to S405.

S402. The service application server sends a first query request to a third-party network device, where the first query request carries at least one of the MOS requirement of the to-be-set up service, the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service.

S403. The third-party network device receives the first query request, and determines the service requirement of the to-be-set up service based on at least one of the MOS requirement of the to-be-set up service, the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service that are carried in the first query request.

It should be noted that for a method for determining, by the third-party network device, the service requirement of the to-be-set up service, reference may be made to the method for determining, by the service application server, the service requirement of the to-be-set up service, and details are not described in this embodiment of this application again.

S404. The third-party network device sends a first query response to the service application server, where the first query response carries the service requirement of the to-be-set up service.

S405. The service application server receives the first query response from the third-party network device.

It may be figured out that before determining the service requirement of the to-be-set up service, the service application server may first obtain "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service" used to determine the service requirement of the to-be-set up service.

The service application server may obtain "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service" in a process in which the core network device sets up a video session for calling UE and called UE. Specifically, before S401 or S402, the method in this embodiment of this application may further include S501 to S504.

S501. The service application server sends a second query request to the core network device, the UE, or the access network device, where the second query request is used to indicate the core network device, the UE, or the access network device to query "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service".

S502. The core network device, the UE, or the access network device receives the second query request from the service application server.

S503. The core network device, the UE, or the access network device queries "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service".

S504. The service application server receives a second query response from the core network device, the UE, or the access network device, where the second query response carries at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service.

The service application server may obtain "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service" by receiving a session message from the UE. Specifically, before S401 or S402, the method in this embodiment of this application may further include S505.

S505. The service application server receives a first message from the UE, where the first message carries at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service.

For example, the first message may be related Session Initiation Protocol (SIP) signaling of the to-be-set up service. The service application server may receive and parse the SIP signaling, to obtain "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service".

Correspondingly, before sending the second setup request carrying the updated service requirement of the to-be-set up service to the access network device, the service application server may determine the updated service requirement of the to-be-set up service. Specifically, before S310 shown in FIG. 6, the method in this embodiment of this application may further include S601, or S602 to S605.

S601. The service application server determines the updated service requirement of the to-be-set up service based on at least one of the MOS requirement of the to-be-set up service, and the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service that are carried in the first setup response or the second setup response.

S602. The service application server sends a third query request to a third-party network device, where the third query request carries at least one of the MOS requirement of the to-be-set up service, and the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service that are carried in the first setup response.

S603. The third-party network device receives the third query request, and determines the updated service requirement of the to-be-set up service based on at least one of the MOS requirement of the to-be-set up service, and the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service that are carried in the first setup response, where the foregoing information is carried in the third query request.

S604. The third-party network device sends a third query response to the service application server, where the first query response carries the updated service requirement of the to-be-set up service.

S605. The service application server receives the third query response from the third-party network device.

It should be noted that for a method for determining, by the service application server or the third-party network device, the updated service requirement of the to-be-set up service, reference may be made to the method for determining, by the service application server, the service requirement of the to-be-set up service, and details are not described in this embodiment of this application again.

Further, the service application server may further terminate the to-be-set up service after receiving the first setup response or the second setup response. Specifically, after S305 shown in FIG. 4, the method in this embodiment of this application may further include: determining, by the service application server based on at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service that are carried in the first setup response or the second setup response, to terminate the to-be-set up service; sending, by the service application server, a to-be-set up service deletion message to the UE, where the to-be-set up service deletion message is used to indicate the UE to terminate the to-be-set up service; and receiving, by the UE, the to-be-set up service deletion message from the service application server, and terminating the to-be-set up service.

In the technical solution of this embodiment, in a process of setting up a service for the UE, the service application server may deliver corresponding service requirement information to the access network device depending on a service demand and a real-time status. Correspondingly, the access network device may use the received service requirement information as an admission threshold of service setup. To be specific, when radio signal quality of the cell in which the UE is located does not satisfy the service requirement, the access network device may refuse to allocate a radio resource to the service, and at the same time, notify the service application server, so that the service application server makes a corresponding adjustment. Alternatively, the access network device may hand over the UE to another cell that can satisfy the service requirement, to complete service setup in the another cell. By using this solution, the access network device may use, as an admission threshold of service setup, the service requirement that is of the to-be-set up service and that is from the service application server, thereby avoiding the problems such as an error and inflexibility caused by determining an admission threshold only based on an empirical value. In addition, for a scenario in which the signal quality of the cell of the UE does not reach the admission threshold (to be specific, a scenario in which the radio channel quality of the first cell does not satisfy the service requirement of the to-be-set up service), for example, a coverage area in which a network signal is weak, a network side may adjust the service requirement depending on an actual network status, or hand over the UE to another cell, to ensure that after a service is set up, the service can be normally executed and user experience during the execution of the service is improved.

The following describes in detail the service setup method in the embodiments of this application by using a video call service setup process in a 4G network as an example. In the embodiments of this application, the UE may be calling UE or called UE of a video call service, and correspondingly, the access network device may be an eNB corresponding to the calling UE or an eNB corresponding to the called UE, and the service application server may be an IMS core network device (for example, P-CSCF\S-CSCF\an SCC AS\ATCF) corresponding to the calling UE or an IMS core network device corresponding to the called UE.

Figure 7A:
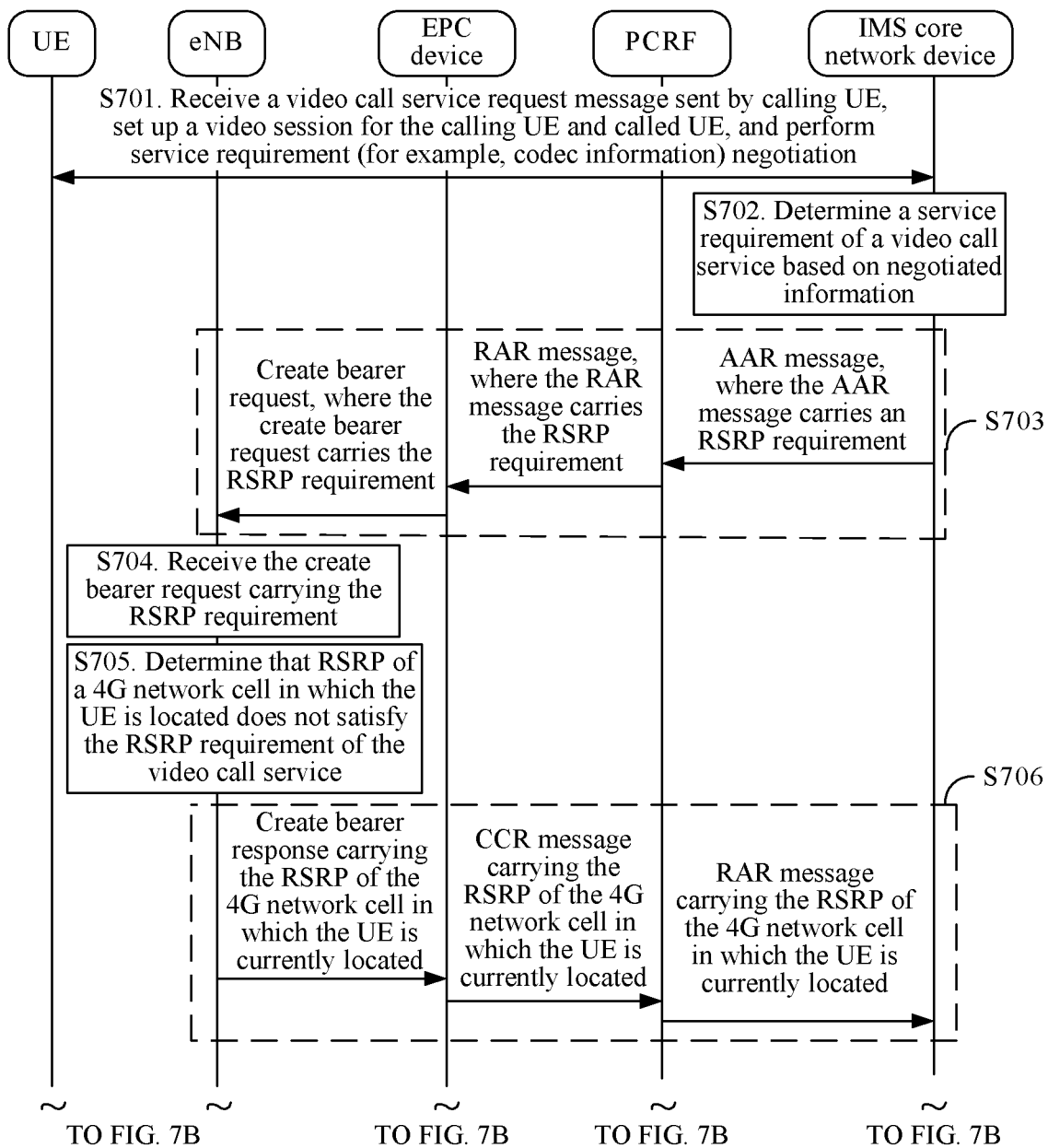
FIG. 7A and FIG. 7B are a flowchart of another service setup method according to an embodiment of this application.
Figure 7B:
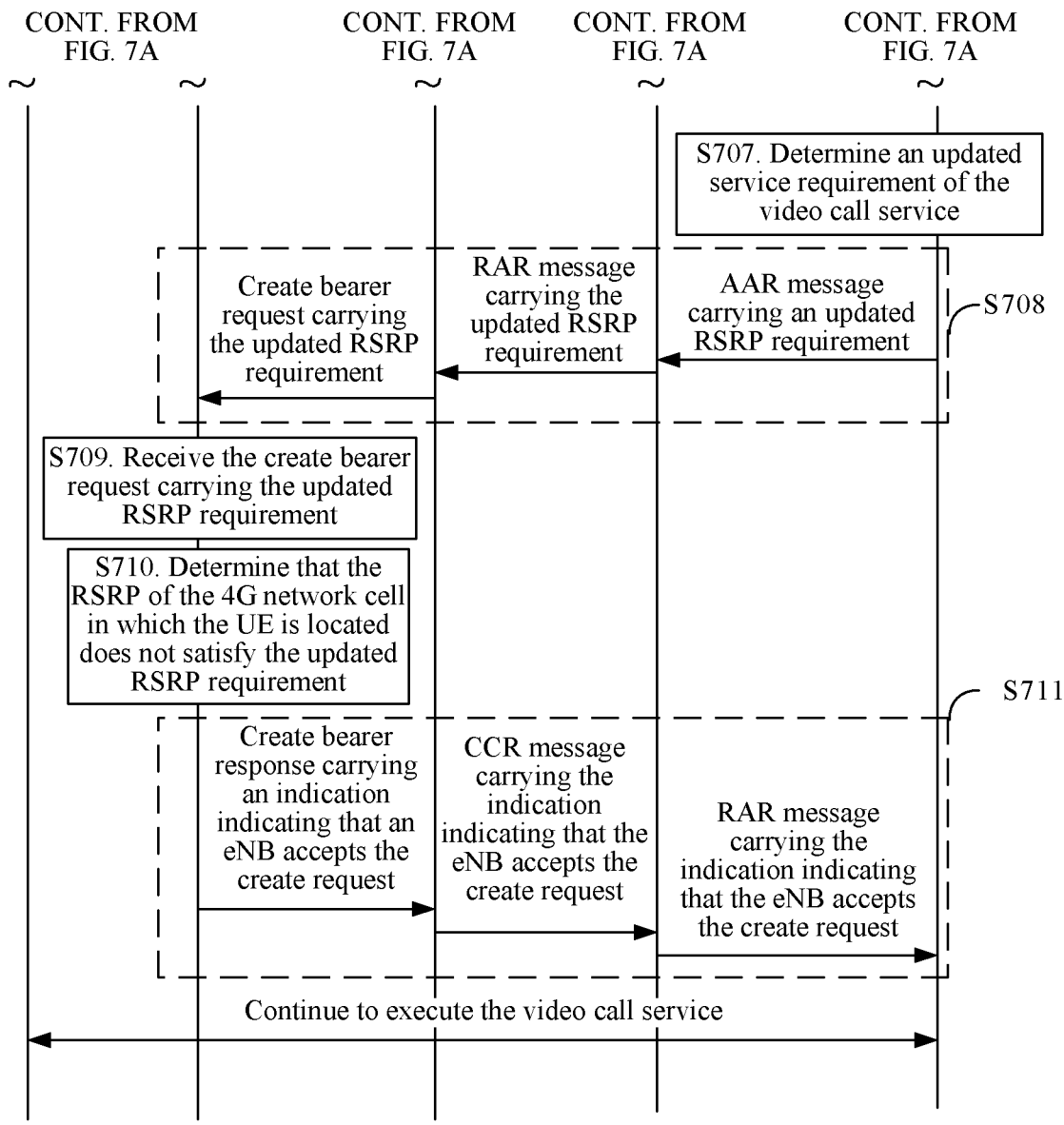

As shown in FIG. 7A and FIG. 7B, a service setup method provided in an embodiment of this application may include the following steps.

S701. An IMS core network device receives a video call service request message from calling UE, sets up a video session for the calling UE and called UE, and performs service requirement (for example, codec information) negotiation.

In a process in which the IMS core network device sets up the video session for the calling UE and the called UE, the IMS core network device may negotiate with the calling UE and the called UE about codec information of the video call service. The codec information of the video call service may include a codec type and codec rating set information of the video call. For example, the codec type of the video call may be a codec scheme such as enhanced voice service (EVS) codec, adaptive multi-rate wideband speech codec (AMR WB), adaptive multi rate-narrow band speech codec (AMR NB), and Moving Picture Experts Group (MPEG) codec. The codec rating set information (codec rating set) of the video call may indicate that a codec rating of the video call is 6.60 to 23.85 kbps.

Further, in the process in which "the IMS core network device sets up the video session for the calling UE and the called UE", the IMS core network device may further obtain other initial parameters of the video call service from UE, an eNB, or an evolved packet core (EPC) device. The other initial parameters may include a terminal type of the UE, radio channel quality of a 4G cell in which the UE is located, carrier frequency information of the 4G cell in which the UE is located, current location information of the UE, load information (for example, whether the cell is overloaded) of the 4G cell in which the UE is located, and information about a bandwidth required by the video call service. For example, the terminal type of the UE may be at least one of an IMEI, an IMSI, and an IMEI of the UE. The IMEI included in the other initial parameters may be specifically a TAC in the first eight bits of the IMEI, and the TAC is usually used to represent a model of the UE. The radio channel quality of the 4G cell in which the UE is located may be at least one of RSRP, RSRQ, and an SINR. The carrier frequency information of the 4G cell in which the UE is located may indicate that a carrier frequency of the 4G cell in which the UE is located is 1800 MHz, 900 MHz, or the like. The current location information of the UE is used to indicate that the UE is located in a 4G cell of a common macro network, a 4G cell of a high-speed railway dedicated network, or the like. The load information of the 4G cell in which the UE is located is used to indicate whether the 4G cell in which the UE is located is overloaded.

For example, in this embodiment of this application, the terminal type information of the UE may be included in related session signaling generated when the UE initiates the video call service. For example, Session Initiation Protocol (SIP) signaling may carry the terminal type information of the UE. The IMS core network device may receive and parse the SIP signaling, to obtain the terminal type information of the UE. The IMS core network device may alternatively obtain the terminal type information of the UE from the UE or the EPC device (for example, an MME) by sending a query request. The SIP signaling may further carry information such as the radio channel quality of the 4G cell in which the UE is located.

S702. The IMS core network device determines a service requirement of a video call service based on at least one of a MOS requirement of the video call service, radio channel quality of a cell in which UE is located, terminal type information of the UE, information about a carrier frequency accessed by the UE, location information of the UE, codec information of the video call service, load information of the cell in which the UE is located, RAT information of the cell in which the UE is located, and bandwidth information of the video call service.

The service requirement of the video call service is a requirement imposed by the video call service on a radio channel of the eNB. The service requirement of the video call service may include at least one of service type indication information of the video call service, a radio channel requirement of the video call service, the codec information of the video call service, and the terminal type of the UE.

The radio channel requirement of the video call service may include at least one of an RSRP requirement, an RSRQ requirement, and an SINR requirement. The radio channel requirement of the video call service is used to indicate that the video call service requires that a minimum standard of RSRP of a first cell in which the UE is located is the RSRP requirement, a minimum standard of RSRQ of the first cell in which the UE is located is the RSRQ requirement, and a minimum standard of an SINR of the first cell in which the UE is located is the SINR requirement. The codec information of the video call service includes the codec type information of the video call service and the codec rating set information of the video call service. The codec information of the video call service is used to indicate a codec type and a codec rating that the video call service is allowed to use. The terminal type information of the UE includes at least one of the IMEI of the UE, the TAC of the IMEI, and the IMSI of the UE.

It may be figured out that if an internal database of the IMS core network device stores a correspondence between the MOS of the video call service or "at least one of the radio channel quality of the cell in which the terminal is located, the terminal type information of the terminal, the information about the carrier frequency accessed by the terminal, the location information of the UE, the codec information of the service, the load information of the cell in which the terminal is located, RAT information of a network in which the terminal is located, and the bandwidth information of the service" and the service requirement of the video call service, the IMS core network device may query the correspondence to determine the service requirement of the video call service.

For example, assuming that the IMS core network device sets a preset MOS requirement of a video service to 4.0 points, in other words, a corresponding minimum MOS value allowing a user to enjoy a video call service completely and fluently is 4, and the IMS core network device has obtained the codec information (if AMR-WB codec is used, an allowed rating set is 6.60 to 23.85 kbps) after the negotiation, the IMS may query the internal database based on the preset MOS requirement and the codec information, to obtain a corresponding RSRP requirement when MOS=4.0 and the codec information is AMR-WB and 6.60 to 23.85 kbps. For another example, assuming that the IMS core network device sets a preset MOS requirement of a video service to 4.0 points, and the IMS core network device has learned that the UE is currently located in the 4G cell of the high-speed railway dedicated network, the IMS may query the internal database based on the preset MOS requirement and the location information of the UE, to obtain a corresponding SINR requirement when MOS=4.0 and the UE is located in the cell of the high-speed railway dedicated network. A method for obtaining, by the IMS core network device, the service requirement based on another parameter is similar to the foregoing descriptions of examples, and details are not described herein again.

Optionally, if the IMS core network device does not store the correspondence, a third-party network device storing the correspondence may determine the service requirement of the video call service, and send the determined service requirement of the video call service to the IMS core network device. A method for determining, by the third-party network device, the service requirement of the video call service is similar to the method for determining, by the IMS core network device, the service requirement of the video call service, and details are not described in this embodiment of this application again.

S703. The IMS core network device sends a first setup request of the video call service to an eNB, to trigger the eNB to allocate a radio resource to the video call service, where the setup request of the video call service carries the service requirement of the video call service.

As shown in FIG. 7A and FIG. 7B, S703 may include:

initiating, by the IMS core network device, an authentication authorization request (AAR) message to a PCRF, to trigger creation of a dedicated bearer of the video call service. In addition to a user identifier of the UE, an IMS application layer charging identifier, media description information, and the like, the AAR message may further carry service requirement information (as shown in FIG. 7A and FIG. 7B, a description is provided by using an example in which the service requirement information of the video call service includes the RSRP requirement) of the video call service.

The PCRF may send a re-authentication request (RAR) message carrying a quality of service (QoS) rule to a PGW of EPC based on the media description information carried in the AAR, to trigger the PGW to create a user plane data dedicated bearer of the video call service. The RAR message carries the service requirement information (as shown in FIG. 1, a description is provided by using an example in which the service requirement information of the video call service includes the RSRP requirement) of the video call service.

After receiving the RAR request from the PCRF, the PGW may trigger a process of creating the dedicated bearer of the video call service, and send a create bearer request message to an eNB of an access network by using an SGW of the EPC and the MME (namely, the EPC device). The create bearer request message carries the service requirement information of the video call service (as shown in FIG. 1, a description is provided by using an example in which the service requirement information of the video call service includes the RSRP requirement).

In another implementation of this embodiment of this application, the IMS core network device may alternatively directly send the setup request of the video call service to the eNB. The setup request of the video call service carries the service requirement information of the video call service. For example, if there is an interface between the IMS core network device and the eNB, the IMS core network device may send the setup request of the video call service to the eNB by using the interface. The interface between the IMS core network device and the eNB is the interface between the service application server and the access network device in the foregoing embodiment.

In another implementation of this embodiment of this application, the IMS core network device (for example, an ATCF or an ATGW) may alternatively generate a user plane data packet (for example, an RTP data packet), and add the service requirement information of the video call service (for example, the RSRP requirement) to the user plane data packet, so that the eNB can parse out the RSRP requirement after receiving the user plane data packet.

S704. The eNB receives the first setup request of the video call service.

S705. The eNB determines that radio channel quality of a 4G network cell in which the UE is located does not satisfy the service requirement of the video call service.

As shown in FIG. 7A and FIG. 7B, the RSRP requirement is used as the service requirement, and S705 is specifically: determining, by the eNB, that RSRP of the 4G network cell in which the UE is located does not satisfy the RSRP requirement of the video call service.

It should be noted that for a method for determining, by the eNB, that the radio channel quality of the 4G network cell in which the UE is located does not satisfy the service requirement of the video call service, reference may be made to the method for determining, by the access network device, that the radio channel quality of the first cell does not satisfy the service requirement of the video call service in the foregoing embodiment, and details are not described in this embodiment of this application again.

After S705, the method in this embodiment of this application may further include S706, S707, or S708. Specifically, the eNB may determine to perform one of S706, S707, or S708 based on indication information included in the service requirement of the video call service.

S706. If determining that the service requirement of the video call service includes first indication information, the eNB sends a first setup response to the IMS core network device.

As shown in FIG. 7A and FIG. 7B, in an implementation of this embodiment of this application, the eNB may send the first setup response to the IMS core network device by using the following manner.

The eNB may send a create bearer response message to the EPC device (for example, the MME). The create bearer response message carries indication information used to indicate that the eNB cannot provide the radio channel quality indicated by the service requirement of the video call service.

The EPC device may send a credit control request (CCR) message to the PCRF after receiving the create bearer response. The CCR message carries indication information used to indicate that creation of the dedicated bearer of the video call service fails, and carries the indication information used to indicate that the eNB cannot provide the radio channel quality indicated by the service requirement of the video call service.

The PCRF may send an RAR message or an abort-session-request (ASR) message to the IMS core network device. The RAR message or the ASR message carries the indication information indicating that the eNB cannot provide the radio channel quality indicated by the service requirement of the video call service.

In addition to the implementation shown in FIG. 7A and FIG. 7B, the eNB may further send the first setup response to the IMS core network device by using the interface between the eNB and the IMS core network device. The interface between the IMS core network device and the eNB is the interface between the service application server and the access network device in the foregoing embodiment. Alternatively, the eNB may add the first setup response to the user plane data packet, and send the user plane data packet to the IMS core network device. For a specific method for sending, by the eNB, the first setup response to the IMS core network device by using the interface between the eNB and the IMS core network device or by using the user plane data packet, refer to the related descriptions in this embodiment of this application, and details are not described herein again.

Optionally, the eNB may further report "at least one of the radio channel quality of the 4G network cell in which the UE is currently located, the terminal type information of the UE, carrier frequency information of the 4G cell, the location information of the UE, time information, load information of the 4G cell, and the bandwidth information of the video call service" by using the create bearer response message, the CCR message, the RAR message or the ASR message, the interface between the eNB and the IMS core network device, or the user plane data packet. As shown in FIG. 7A and FIG. 7B, that the first setup response carries "at least one of the radio channel quality of the 4G network cell in which the UE is currently located, the terminal type information of the UE, the carrier frequency information of the 4G cell, the location information of the UE, the time information, the load information of the 4G cell, and the bandwidth information of the video call service" is described by using an example in which the create bearer response, the CCR message, or the RAR message carries the RSRP of the first cell.

Further, the method in this embodiment of this application may further include:

if the eNB determines that the service requirement of the video call service includes second indication information, and the eNB determines that a second cell whose radio channel quality satisfies the service requirement of the video call service exists, handing over, by the eNB, the UE to the second cell; or if the eNB determines that the service requirement of the video call service includes third indication information, and the eNB determines that a third cell whose radio channel quality satisfies the service requirement of the video call service exists, handing over, by the eNB, the UE to the third cell.

Because it is determined that the radio channel quality of the 4G network cell in which the UE is located does not satisfy the service requirement of the video call service, to be specific, the radio channel quality of the 4G network cell in which the UE is currently located is greater than a service requirement threshold delivered by the IMS core network device, the eNB may perform an internal handover process for the UE in a 4G network, to hand over the UE from the first cell to the second cell in the 4G network, or the eNB may perform an inter-network handover process for the UE from a 4G network to a 3G network or 2G network, to hand over the UE from the first cell of the 4G network to the third cell of the 3G network or 2G network.

It should be noted that after the eNB hands over the UE from the first cell of the 4G network to the third cell of the 3G network or 2G network, the video call service may be executed in a packet switched (PS) domain of the 3G network or 2G network. In this case, the inter-network handover process belongs to a PS to PS handover process. Alternatively, the video call service may be executed in a circuit switched (CS) domain of the 3G network or 2G network. In this case, the inter-network handover process belongs to a PS to CS handover process.

For a method for determining, by the eNB, that the second cell or the third cell whose radio channel quality satisfies the service requirement of the video call service exists, refer to the related descriptions in the foregoing embodiment, and details are not described in this embodiment of this application again.

Optionally, in this embodiment of this application, the IMS core network device may add the indication information (the first indication information, the second indication information, or the third indication information) to the service requirement of the video call service when the UE satisfies the following conditions.

Condition 1: The UE supports speech codec A and speech codec B.

Condition 2: A requirement imposed by the speech codec B on radio channel quality of a cell is lower than a requirement imposed by the speech codec A on the radio channel quality of the cell.

Condition 3: The video call service currently uses the speech codec A.

For example, it is assumed that the UE supports both EVS codec and AMR WB codec, and the video call service currently uses the AMR WB codec. Under same user experience, using RSRP as an example, a requirement imposed by the EVS codec on RSRP of a cell is RSRP>−120 dBm, and a requirement imposed by the AMR WB codec on the RSRP of the cell is RSRP>−115 dBm. In this case, the IMS core network device may add the first indication information to the service requirement information of the video call service, so that when the RSRP of the first cell does not satisfy the requirement imposed by the AMR WB on the RSRP of the cell, the eNB may send the first setup response to notify the IMS core network device, and accordingly the IMS core network device uses the EVS codec, thereby avoiding execution of single radio voice call continuity (SRVCC). Alternatively, the IMS core network device may add the second indication information or the third indication information to the service requirement information of the video call service, so that when the RSRP of the first cell does not satisfy the requirement imposed by the AMR WB on the RSRP of the cell, the eNB may directly execute SRVCC, and another cell provides a corresponding radio resource of the video call service for the UE.

The second cell or the third cell whose radio channel quality satisfies the service requirement of the video call service may not exist. In this case, as shown in FIG. 7A and FIG. 7B, the method in this embodiment of this application may further include: if the eNB determines that the second cell or the third cell whose radio channel quality satisfies the service requirement of the video call service does not exist, sending, by the eNB, a second setup response to the IMS core network device; and receiving, by the IMS core network device, the second setup response from the eNB.

When the second cell or the third cell whose radio channel quality satisfies the service requirement of the to-be-set up service does not exist, the eNB may refuse to allocate a radio resource to the video call service, and notify (by using the second setup response) the IMS core network device that the radio channel quality of the first cell does not satisfy the service requirement of the video call service and the second cell or the third cell whose radio channel quality satisfies the service requirement of the video call service does not exist.

S707. The IMS core network device determines an updated service requirement of the video call service based on the received first setup response or second setup response.

It may be figured out that the IMS core network device may determine the updated service requirement of the video call service based on "at least one of the radio channel quality of the first cell, the terminal type information of the UE, the information about the carrier frequency accessed by the UE, the location information of the UE, the codec information of the video call service, the load information of the first cell, the RAT information of the first network, and the bandwidth information of the video call service" carried in the first setup response or the second setup response. A method for determining, by the IMS core network device, the updated service requirement of the video call service is similar to the method for determining, by the IMS core network device, the service requirement of the video call service, and details are not described in this embodiment of this application again.

For example, it is assumed that the service requirement of the video call service includes the codec information of the video call service. The video call service uses AMR-WB codec, a codec rating of the AMR-WB codec is 23.85 kbps, and a requirement imposed by the AMR-WB codec on the RSRP of the first cell is RSRP>–115 dBm. However, if the RSRP of the first cell is –118 dBm (<–11 dBm), the IMS core network device may change a codec type of the video service to the EVS codec, adjust a codec rating to 13.2 kbps codec, and determine, based on an EVS codec scheme, that a requirement imposed by the EVS codec on the RSRP of the first cell is RSRP>–120 dBm (<–118 dBm).

Optionally, the IMS core network device may send a service codec information adjustment notification message (to be specific, the second message) to the calling UE and the called UE after adjusting the codec information of the video call service. In addition, if the called UE does not support the EVS codec, the IMS core network device subsequently may change a codec scheme for the calling UE and the called UE.

S708. The IMS core network device sends a second setup request of the video call service to the eNB.

For example, as shown in FIG. 7A and FIG. 7B, a method for sending, by the IMS core network device, the second setup request of the video call service to the eNB is similar to the method for sending, by the IMS core network device, the first setup request of the video call service to the eNB, and details are not described in this embodiment of this application again. FIG. 7A and FIG. 7B use an example in which updated RSRP is used as the updated service requirement of the video call service.

S709. The eNB receives the second setup request from the IMS core network device, where the second setup request carries the updated service requirement of the video call service.

For example, as shown in FIG. 7A and FIG. 7B, based on the foregoing example, S709 is: receiving, by the eNB, a create bearer request carrying the updated RSRP requirement.

After receiving the updated service requirement of the video call service, the eNB may continue to perform S705, to be specific, determine whether the radio channel quality of the 4G network cell in which the UE is located satisfies the updated service requirement of the video call service, and perform a subsequent corresponding process. As shown in FIG. 7A and FIG. 7B, the method in this embodiment of this application may further include S710 and S711. For detailed descriptions of S710 and S711, refer to related content in this embodiment of this application, and details are not described herein again.

Further, in this embodiment of this application, the IMS core network device may further terminate the video call service after receiving the first setup response or the second setup response. The IMS core network device may terminate the video call service when determining that no further adjustment can be made to the service requirement of the video call service to enable the radio channel quality of the first cell to satisfy the service requirement of the video call service. The IMS core network device may send a video call service deletion message to the calling UE when determining to terminate the video call service. The deletion message may carry a specific reason value of terminating the video call service, for example, the radio channel quality of the first cell cannot satisfy the service requirement of the video call service.

In an implementation, after the IMS core network device receives the first setup response or the second setup response from the eNB, if the IMS core network device determines that no further adjustment can be made to the service requirement of the video call service to enable the radio channel quality of the first cell to satisfy the service requirement of the video call service, the IMS core network device may negotiate with the calling UE to ask the calling UE whether the calling UE accepts current service experience and continue to retain the service. If the UE accepts the current service experience, the IMS core network device does not adjust the service requirement of the video call service or perform an operation of terminating the video call service, and may re-trigger a process of creating the dedicated bearer of the video call service to the EPC device and the eNB. In this process of creating the dedicated bearer of the video call service, the IMS core network device does not send the service requirement of the video call service to the EPC device and the eNB, or the IMS core network device may send the service requirement of the video call service, and at the same time, indicate the eNB to: ignore the service requirement of the video call service when the eNB allocates a radio resource to the video call service.

In the service setup method provided in this embodiment of this application, in the process of setting up the video call service for the UE, the IMS core network device may deliver the service requirement of the video call service to the eNB. Correspondingly, the eNB may use the received service requirement of the video call service as an admission threshold of video call service setup. To be specific, when radio signal quality of the cell in which the UE is located does not satisfy the service requirement of the video call service, the eNB may refuse to allocate a radio resource to the video call service, and at the same time, notify the IMS core network device, so that the IMS core network device makes a corresponding adjustment to the service requirement of the video call service, to complete video call service setup in this cell. Alternatively, the eNB may hand over the UE to another 4G cell or 2G/3G cell that can satisfy the service requirement, to complete video call service setup in the another cell.

It should be noted that the foregoing embodiment describes, merely by using a video call service in a 4G network as an example, the service setup method provided in the embodiments of this application. The service setup method provided in the embodiments of this application may be further applied to another service setup process in another network standard. By using this solution, a network side may adaptively determine an admission threshold of service setup depending on service requirements of different services, thereby avoiding problems such as an error and inflexibility caused by determining an admission threshold only based on an empirical value. In addition, for a scenario in which the signal quality of the cell of the UE is lower than the admission threshold, for example, a coverage area in which a network signal is weak, the network side may adjust the service requirement depending on an actual network status, or hand over the UE to another cell, to ensure that after a service is set up, the service can be normally executed and user experience during the execution of the service is improved.

Figure 8:
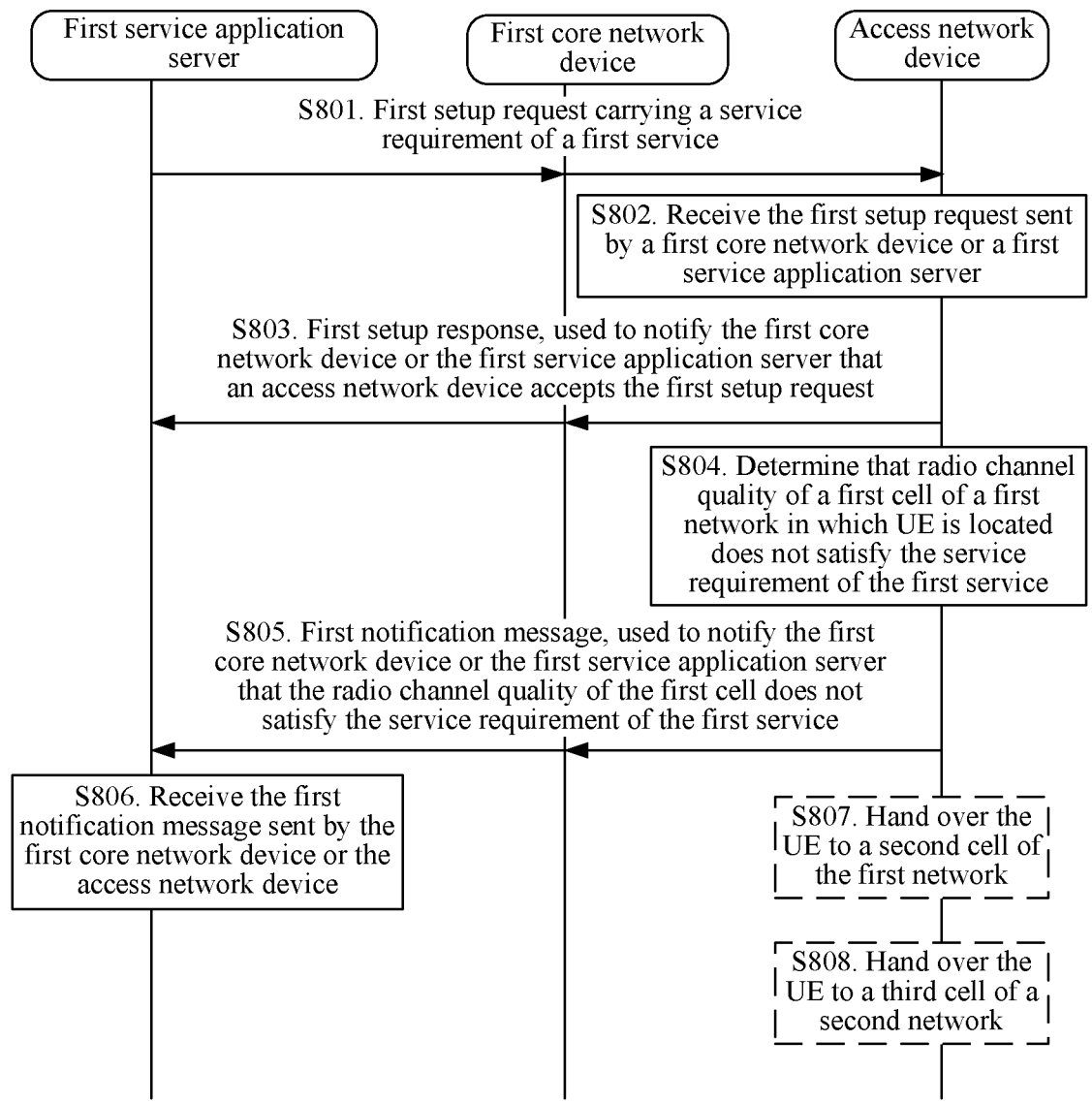
FIG. 8 is a flowchart of another service setup method according to an embodiment of this application.

An embodiment of this application provides a service setup method. As shown in FIG. 8, the service setup method includes the following steps.

S801. A first service application server sends a first setup request to an access network device or a first core network device, where the first setup request carries a service requirement of a first service, and the service requirement of the first service is used to indicate, to the access network device, a radio channel quality requirement required for user equipment UE to execute the first service.

It should be noted that for specific content of the service requirement of the first service, reference may be made to the detailed description of the service requirement of the to-be-set up service in the foregoing embodiment, and details are not described in this embodiment of this application again.

S802. The access network device receives the first setup request from the first core network device or the first service application server.

S803. The access network device sends a first setup response to the first core network device or the first service application server, where the first setup response is used to notify the first core network device or the first service application server that the access network device accepts the first setup request.

Radio channel quality of each cell in a network may change at any time. In other words, after the access network device sends the first setup response to the first core network device or the first service application server in S803, the radio channel quality of the first cell may not satisfy the service requirement of the first service. Specifically, after S803, the method in this embodiment of this application may further include S804.

S804. The access network device determines that radio channel quality of a first cell of a first network in which the UE is located does not satisfy the service requirement of the first service.

It should be noted that for a specific method for determining, by the access network device, whether the radio channel quality of the first cell of the first network in which the UE is located satisfies the service requirement of the first service in this embodiment, reference may be made to the specific method for determining, by the access network device, whether the radio channel quality of the first cell satisfies the service requirement of the to-be-set up service in the foregoing embodiment, and details are not described in this embodiment of this application again.

For example, in an application scenario of this embodiment of this application, the service requirement of the first service may include codec information of the first service and a codec information list of the UE. The codec information list of the UE includes codec information supported by both the UE and the service application server.

In this application scenario, the "determining, by the access network device, that radio channel quality of a first cell of a first network in which UE is located does not satisfy the service requirement of the first service" in S804 may specifically include: determining, by the access network device, that the radio channel quality of the first cell satisfies radio channel quality required by at least one type of codec information in the codec information list of the UE but the radio channel quality of the first cell does not satisfy radio channel quality required by the codec information of the to-be-set up service.

When the radio channel quality of the first cell does not satisfy the service requirement of the first service, any step of S805, S806, or S807 may be performed.

S805. The access network device sends a first notification message to the first core network device or the first service application server, where the first notification message is used to notify the first core network device or the first service application server that the radio channel quality of the first cell does not satisfy the service requirement of the first service.

The first notification message carries at least one of the radio channel quality of the first cell, terminal type information of the UE, information about a carrier frequency accessed by the UE, location information of the UE, load information of the first cell, RAT information of the first network, recommended codec information, and bandwidth information of the first service.

It may be figured out that after determining that the radio channel quality of the first cell satisfies the radio channel quality required by at least one type of codec information in the codec information list of the UE, the access network device may determine the recommended codec information. The recommended codec information may be codec information that is selected by the access network device from the codec information list of the UE and that is supported by both the UE and the service application server, and the recommended codec information is one piece of codec information in codec information supported by the first cell.

S806. The first service application server receives the first notification message from the first core network device or the access network device.

S807. The access network device hands over the UE to a second cell of the first network.

S808. The access network device hands over the UE to a third cell of a second network.

In this embodiment, the first network is the same as the first network in the foregoing embodiment, the second network is the same as the second network in the foregoing embodiment, and for detailed descriptions of the first network and the second network, refer to the related content in the foregoing embodiment.

In the service setup method provided in this embodiment of this application, because the first setup request received by the access network device carries the service requirement of the first service, after the access network device accepts the first setup request (to be specific, sends the first setup response to the service application server), if the radio channel quality of the cell in which the UE is located does not satisfy the service requirement of the first service, the access network device refuses to allocate a radio resource to the service, and at the same time, sends, to the service application server, the first notification message used to notify the service application server that "the radio channel quality of the first cell does not satisfy the service requirement of the first service", or hands over the UE to another cell, to complete setup of the first service in the another cell. By using this solution, a network side may adaptively determine an admission threshold (to be specific, a service requirement of a service) of service setup, thereby avoiding problems such as an error and inflexibility caused by determining an admission threshold only based on an empirical value. In addition, for a scenario in which the signal quality of the cell of the UE does not reach the admission threshold, for example, a coverage area in which a network signal is weak, the network side may adjust the service requirement depending on an actual network status, or hand over the UE to another cell, to ensure that after a service is set up, the service can be normally executed and user experience during the execution of the service is improved.

In an implementation of this embodiment of this application, the first service application server may indicate, by using indication information included in the service requirement of the to-be-set up service, the access network device to: directly reply to the first service application server with the first notification message or hand over the UE to another cell when the radio channel quality of the first cell does not satisfy the service requirement of the first service, to be specific, indicate the access network device to: determine to perform one of S805, S807, or S808 when the radio channel quality of the first cell does not satisfy the service requirement of the to-be-set up service.

Figure 9:
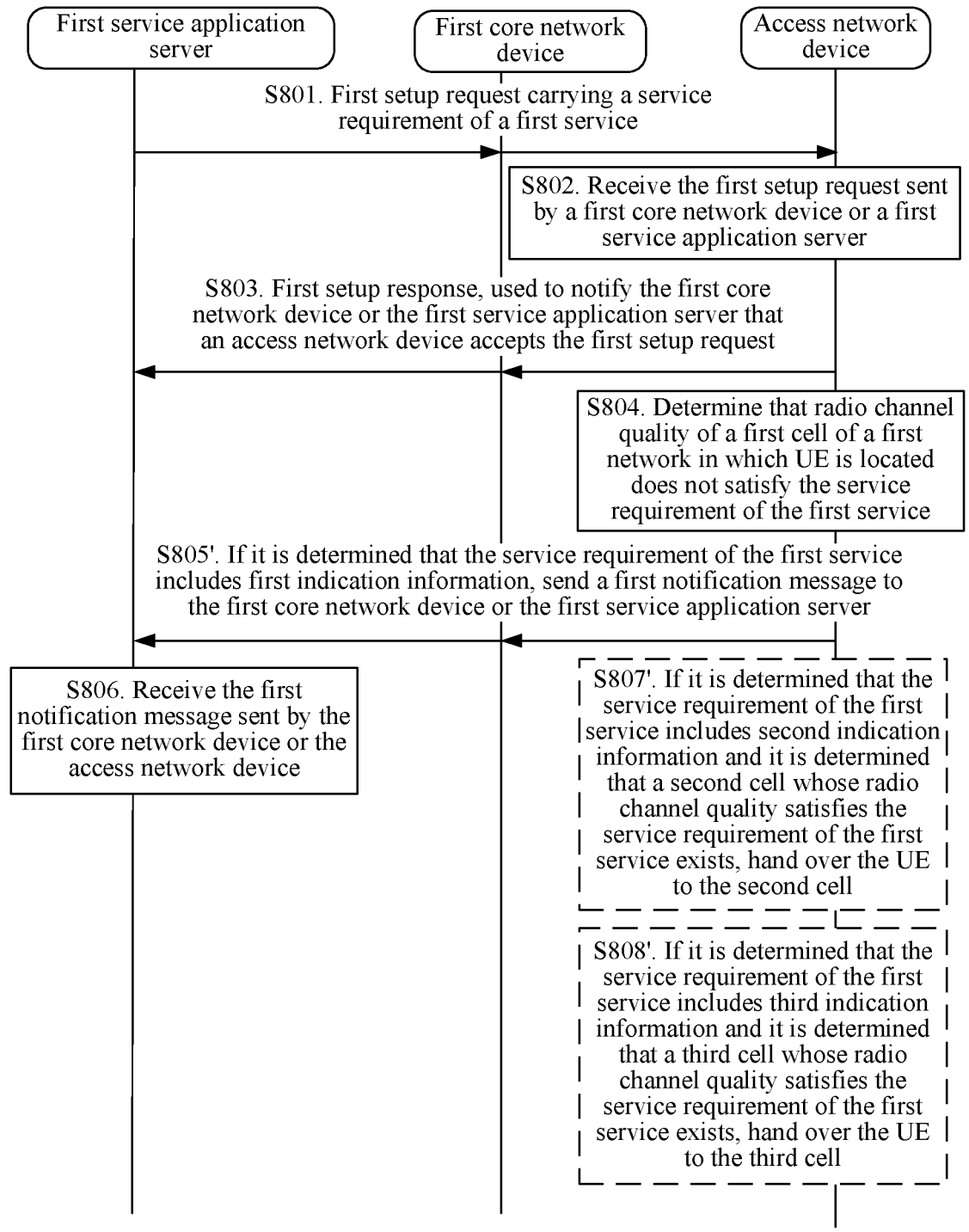
FIG. 9 is a flowchart of another service setup method according to an embodiment of this application.

Specifically, as shown in FIG. 9, S805 in FIG. 8 may be replaced with S805', S807 may be replaced with S807', and S808 may be replaced with S808'.

S805'. If determining that the service requirement of the first service includes first indication information, the access network device sends a first notification message to the first core network device or the first service application server.

The first indication information is used to indicate the access network device to: send the first notification message to the first core network device or the first service application server when the radio channel quality of the first cell does not satisfy the service requirement of the first service.

S807'. If the access network device determines that the service requirement of the first service includes second indication information and the access network device determines that a second cell whose radio channel quality satisfies the service requirement of the first service exists, the access network device hands over the UE to the second cell.

The second indication information is used to indicate the access network device to: hand over the UE to the second cell when the radio channel quality of the first cell does not satisfy the service requirement of the first service.

S808'. If the access network device determines that the service requirement of the first service includes third indication information and the access network device determines that a third cell whose radio channel quality satisfies the service requirement of the first service exists, the access network device hands over the UE to the third cell.

The third indication information is used to indicate the access network device to: hand over the UE to the third cell when the radio channel quality of the first cell does not satisfy the service requirement of the first service.

Further, before S803 shown in FIG. 9, the method in this embodiment of this application further includes S809.

S809. The access network device determines that the radio channel quality of the first cell satisfies the service requirement of the first service.

It should be noted that in this embodiment of this application, a method for determining, by the access network device, that the second cell or the third cell whose radio channel quality satisfies the service requirement of the first service exists is similar to the method for determining, by the access network device, that the second cell whose radio channel quality satisfies the service requirement of the to-be-set up service exists, and details are not described in this embodiment of this application again.

Figure 10:
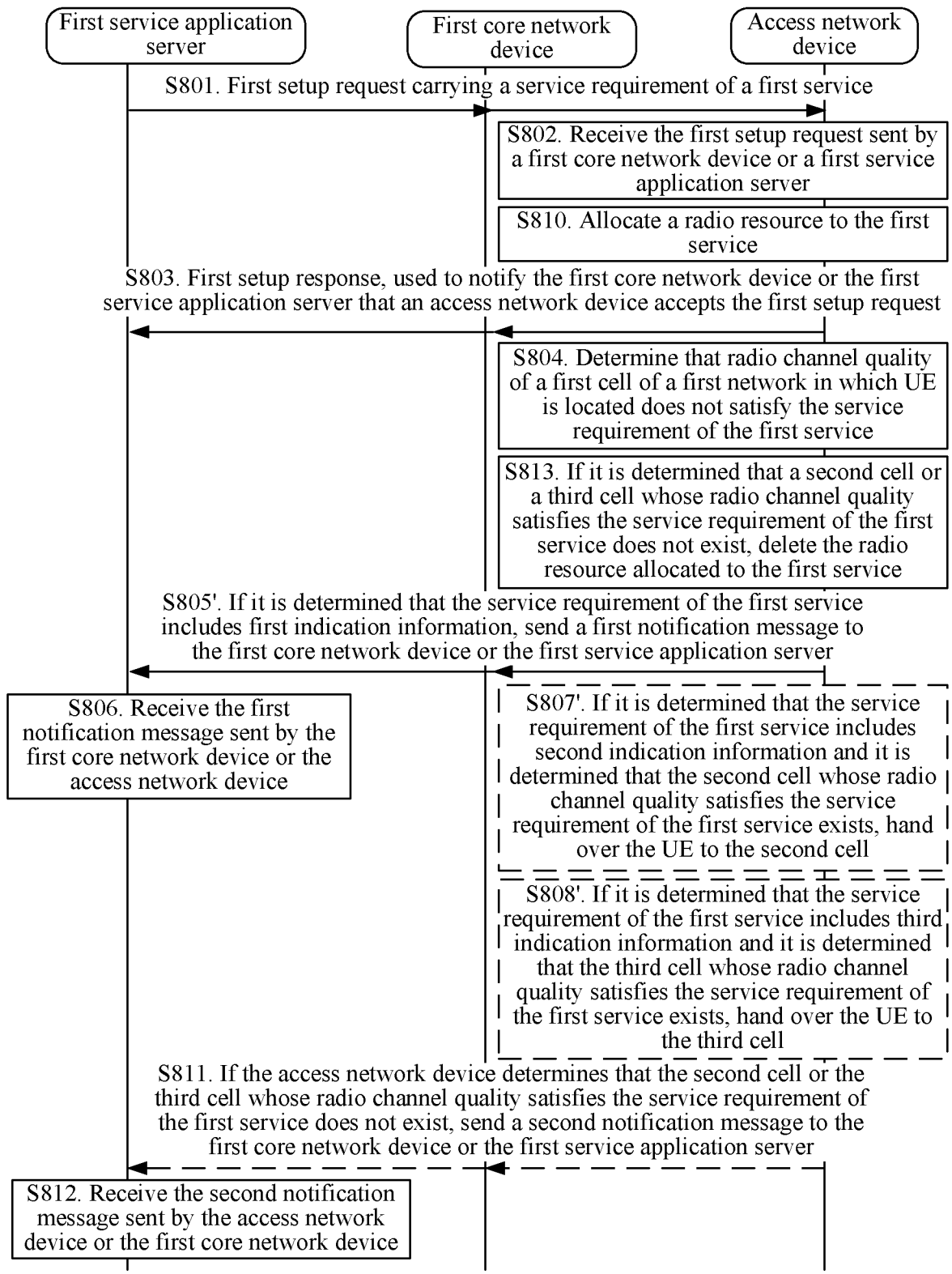
FIG. 10 is a flowchart of another service setup method according to an embodiment of this application.

Further, as shown in FIG. 10, after S802 shown in FIG. 9, the method in this embodiment of this application further includes S810.

S810. The access network device allocates a radio resource to the first service.

Further, when the second cell or the third cell whose radio channel quality satisfies the service requirement of the first service does not exist, as shown in FIG. 10, the method in this embodiment of this application may further include S811 and S812.

S811. If the access network device determines that the second cell or the third cell whose radio channel quality satisfies the service requirement of the first service does not exist, the access network device sends a second notification message to the first core network device or the first service application server.

The second notification message is used to notify the first core network device or the first service application server that the radio channel quality of the first cell does not satisfy the service requirement of the first service and the second cell or the third cell whose radio channel quality satisfies the service requirement of the first service does not exist. The second notification message carries at least one of the radio channel quality of the first cell, the terminal type information of the UE, the information about the carrier frequency accessed by the UE, the location information of the UE, the load information of the first cell, the RAT information of the first network, the recommended codec information, and the bandwidth information of the first service.

S812. The first service application server receives the second notification message from the access network device or the first core network device.

Further, after S810 shown in FIG. 10, the method in this embodiment of this application further includes S813.

S813. If the access network device determines that the second cell or the third cell whose radio channel quality satisfies the service requirement of the first service does not exist, the access network device deletes the radio resource allocated to the first service.

After receiving the first notification message or the second notification message, the first service application server may determine that the radio channel quality of the first cell does not satisfy the service requirement of the first service, and then send a first service modification request carrying an updated service requirement of the first service to the access network device. Specifically, after S805, S805', or S811, the method in this embodiment of this application may further include the following steps:

The first service application server sends a first service modification request to the access network device or the first core network device, where the first service modification request carries an updated service requirement of the first service.

The access network device receives the first service modification request from the first core network device or the first service application server.

It should be noted that a method for receiving, by the access network device, the first service modification request from the first core network device or the first service application server is similar to the method for receiving, by the access network device, the first setup request from the core network device or the first service application server, and details are not described in this embodiment of this application again.

It may be figured out that after receiving the first service modification request, the access network device may determine whether the radio channel quality of the first cell satisfies the updated service requirement of the first service carried in the first service modification request. For a method for determining, by the access network device, whether the radio channel quality of the first cell satisfies the updated service requirement of the first service, refer to the method for determining, by the access network device, whether the radio channel quality of the first cell satisfies the service requirement of the to-be-set up service, and details are not described in this embodiment of this application again.

In this embodiment of this application, the first service is similar to the to-be-set up service in the foregoing embodiment, the codec information of the first service may be first codec information, and updated codec information of the first service may be second codec information. When sending the first service modification request, the first service application server may determine that the updated codec information of the first service is the second codec information, and change the codec information of the first service from the first codec information to the second codec information. The first service application server may further send a second message to the UE, and the second message is used to indicate that the codec information of the first service is changed from the first codec information to the second codec information.

It may be figured out that the first service application server may change the codec information of the first service from the first codec information to the second codec information when determining that a radio channel requirement corresponding to the first codec information is higher than a radio channel requirement corresponding to the second codec information, and send the second message to the UE.

Further, the access network device may further receive a service setup request that is from another service application server and used to set up another service different from the first service. Specifically, the access network device may receive a second setup request from a second core network device or a second service application server. The second setup request carries a service requirement of a second service, and the service requirement of the second service is used to indicate, to the access network device, a radio channel quality requirement required for the UE to execute the second service. After determining that the service requirement of the second service is higher than the service requirement of the first service, the access network device may deliver a second measurement control command to the UE. The second measurement control command is used to indicate the UE to measure the radio channel quality of the first cell, and send a second measurement report to the access network device when the radio channel quality of the first cell does not satisfy the service requirement of the second service. The second measurement report is used to indicate, to the access network device, that the radio channel quality of the first cell does not satisfy the service requirement of the second service.

It should be noted that in this embodiment of this application, the first service application server may further determine the service requirement of the first service before sending the first setup request carrying the service requirement of the first service to the access network device. A method for determining, by the first service application server, the service requirement of the first service is similar to the method for "determining, by the service application server, the service requirement of the to-be-set up service" in the foregoing embodiment, and details are not described in this embodiment of this application again.

Before determining the service requirement of the first service, the first service application server may further obtain "at least one of the radio channel quality of the first cell, the terminal type information of the UE, the information about the carrier frequency accessed by the UE, the location information of the UE, the codec information of the to-be-set up service, the load information of the first cell, the RAT information of the first network, and the bandwidth information of the to-be-set up service" (briefly referred to as service requirement obtaining information) used to determine the service requirement of the first service. For a method for obtaining, by the first service application server, the service requirement obtaining information, refer to the related descriptions of S501 to S504 in the foregoing embodiment, and details are not described in this embodiment of this application again.

Further, a method for determining, by the first service application server, the updated service requirement of the first service is similar to the method for "determining, by the service application server, the updated service requirement of the to-be-set up service" (to be specific, the related descriptions of S601 to S605) in the foregoing embodiment, and details are not described in this embodiment of this application again.

The following describes in detail the service setup method in the embodiments of this application by using a VoLTE service setup process in a 4G network as an example. In this embodiment of this application, UE may be calling UE or called UE of a VoLTE service, and correspondingly, an access network device may be an eNB corresponding to the calling UE or an eNB corresponding to the called UE, and a service application server may be an IMS core network device (for example, P-CSCF\S-CSCF\an SCC AS\ATCF) corresponding to the calling UE or an IMS core network device corresponding to the called UE.

Figure 11A:
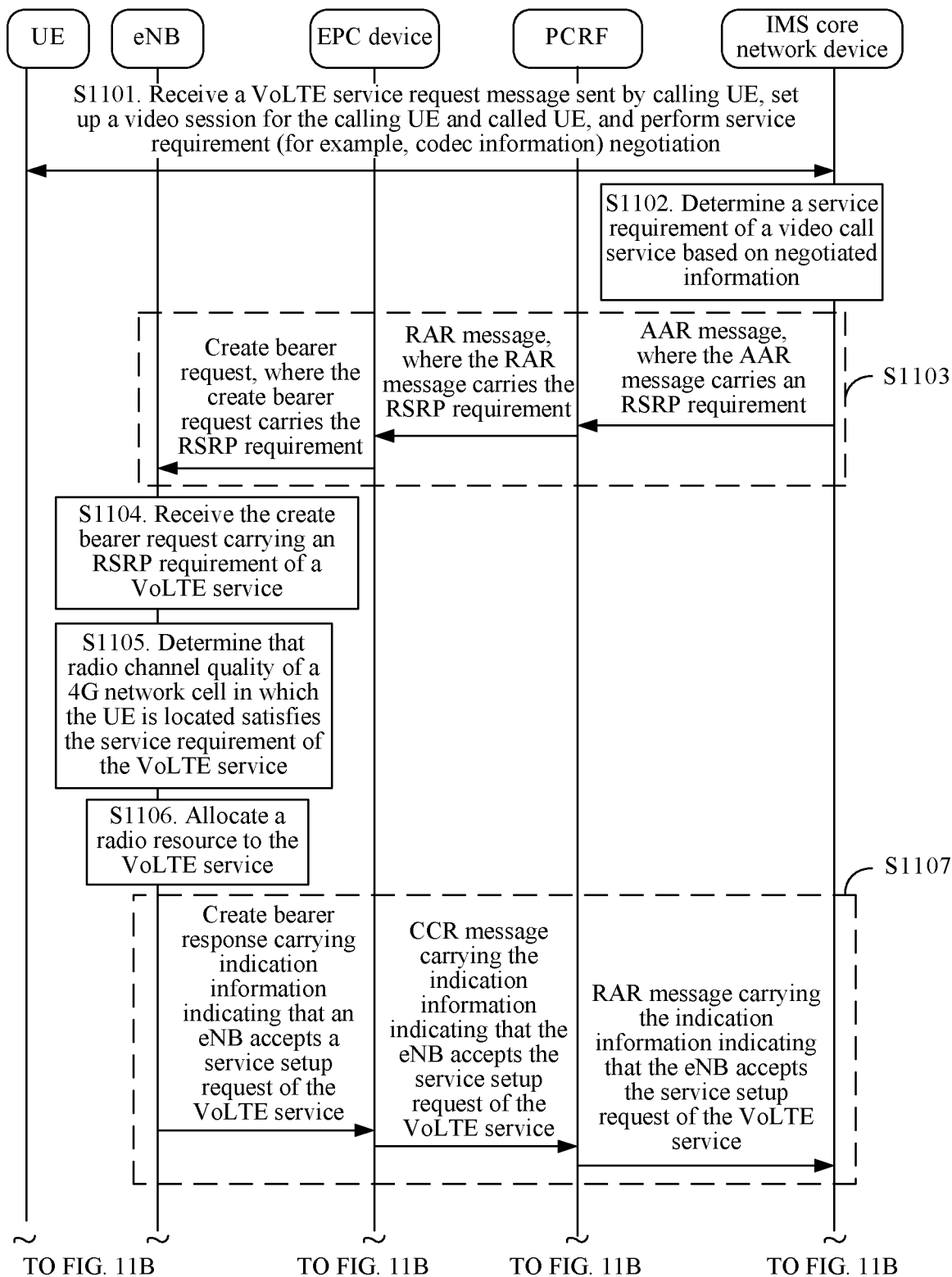
FIG. 11A and FIG. 11B are a flowchart of another service setup method according to an embodiment of this application.
Figure 11B:
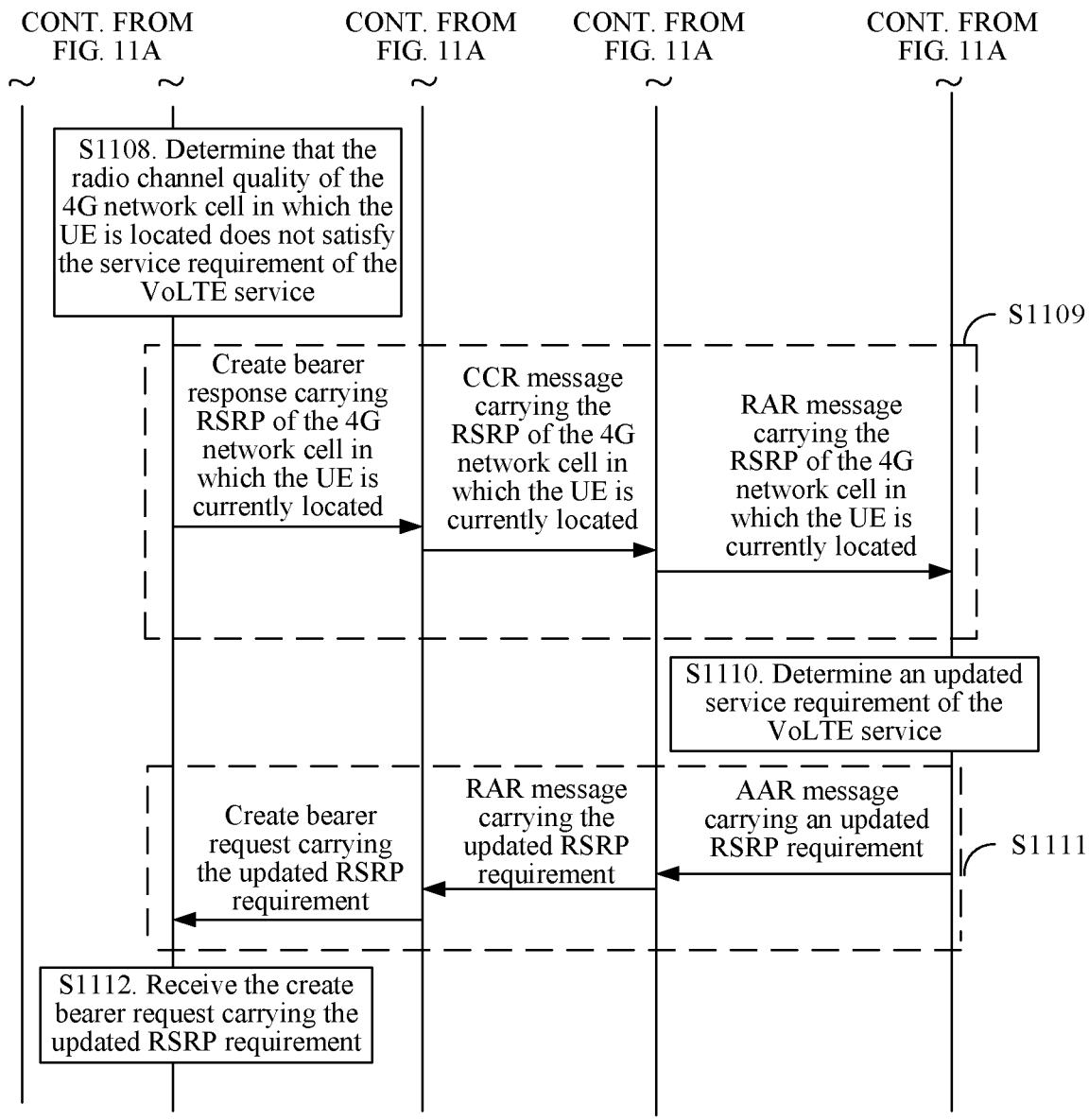

As shown in FIG. 11A and FIG. 11B, a service setup method provided in an embodiment of this application may include the following steps.

S1101. An IMS core network device receives a VoLTE service request message from calling UE, sets up a video session for the calling UE and called UE, and performs service requirement (for example, codec information) negotiation.

S1102. The IMS core network device determines a service requirement of a VoLTE service based on at least one of a MOS requirement of the VoLTE service, radio channel quality of a cell in which UE is located, terminal type information of the UE, information about a carrier frequency accessed by the UE, location information of the UE, codec information of a video call service, load information of the cell in which the UE is located, RAT information of the cell in which the UE is located, and bandwidth information of the video call service.

S1103. The IMS core network device sends a first setup request of the VoLTE service to an eNB, to trigger the eNB to allocate a radio resource to the VoLTE service, where the first setup request carries the service requirement of the VoLTE service.

S1104. The eNB receives the first setup request of the VoLTE service.

As shown in FIG. 11A and FIG. 11B, S1104 may be specifically: receiving, by the eNB, a create bearer request carrying an RSRP requirement of the VoLTE service.

It should be noted that for detailed descriptions of S1101 to S1104 in this embodiment of this application, reference may be made to related content in S701 to S704 in the foregoing embodiment, and details are not described in this embodiment of this application again.

S1105. The eNB determines that radio channel quality of a 4G network cell in which the UE is located satisfies the service requirement of the VoLTE service.

For a method for determining, by the eNB, that the radio channel quality of the 4G network cell in which the UE is located satisfies the service requirement of the video call service, refer to the method for determining, by the eNB, whether the radio channel quality of the 4G network cell in which the UE is located satisfies the service requirement of the video call service in the foregoing embodiment, and details are not described in this embodiment of this application again.

S1106. The eNB allocates a radio resource to the VoLTE service.

S1107. The eNB sends a first setup response to the IMS core network device.

The first setup response is used to notify the IMS core network device that the access network device accepts the first setup request.

As shown in FIG. 11A and FIG. 11B, FIG. 11A and FIG. 11B show a specific manner of sending, by the eNB, the first setup response to the IMS core network device in an implementation of this embodiment of this application. For detailed descriptions of the specific manner of sending, by the eNB, the first setup response to the IMS core network device in FIG. 11A and FIG. 11B, refer to the related descriptions of S706 in the foregoing embodiment, and details are not described in this embodiment of this application again.

It should be emphasized that different from the create bearer response, the CCR message, the RAR message, or the ASR message in FIG. 7A and FIG. 7B, a create bearer response, a CCR message, an RAR message, or an ASR message shown in FIG. 11A and FIG. 11B does not carry "indication information indicating that the eNB cannot provide radio channel quality indicated by the service requirement of the video call service", but carries "indication information indicating that the eNB accepts the first setup request (to be specific, the service setup request of the VoLTE service)" or "indication information indicating that a radio resource is successfully reserved".

In addition to the implementation shown in FIG. 11A and FIG. 11B, the eNB may further send the first setup response to the IMS core network device by using an interface between the eNB and the IMS core network device or by using a user plane data packet. For a method for sending, by the eNB, the first setup response to the IMS core network device by using the interface between the eNB and the IMS core network device or by using the user plane data packet, refer to the related descriptions of S706 in the foregoing embodiment, and details are not described in this embodiment of this application again.

Further, because radio channel quality of each cell in a network may change at any time, after S1107, the radio channel quality of the 4G network cell in which the UE is located may change, and changed radio channel quality does not satisfy the service requirement of the VoLTE service. In this case, the method in this embodiment of this application may further include the following steps.

S1108. The eNB determines that the radio channel quality of the 4G network cell in which the UE is located does not satisfy the service requirement of the VoLTE service.

For a specific method for determining, by the eNB, that the radio channel quality of the 4G network cell in which the UE is located does not satisfy the service requirement of the VoLTE service, refer to the method for determining, by the eNB, that the radio channel quality of the 4G network cell in which the UE is located does not satisfy the service requirement of the video call service in the foregoing embodiment, and details are not described in this embodiment of this application again.

S1109. If determining that the service requirement of the VoLTE service includes first indication information, the eNB sends a first notification message to the IMS core network device.

The first notification message is used to notify the IMS core network device that the radio channel quality of the 4G network cell in which the UE is located does not satisfy the service requirement of the VoLTE service. The first notification message carries at least one of the radio channel quality of the 4G network cell (to be specific, the first cell) in which the UE is located, the terminal type information of the UE, the information about the carrier frequency accessed by the UE, the location information of the UE, the load information of the 4G network cell in which the UE is located, RAT information of a 4G network in which the UE is located, and the bandwidth information of the VoLTE service.

The first notification message in this embodiment of this application may be a new message temporarily not defined in a standard. Alternatively, as shown in FIG. 11A and FIG. 11B, for a specific method for sending, by the eNB, the first notification message to the IMS core network device in S1109, refer to the specific method for sending, by the eNB, the first setup response to the IMS core network device in S706 in the foregoing embodiment, and details are not described in this embodiment of this application again.

In addition to the implementation shown in FIG. 11A and FIG. 11B, the eNB may further directly send the first notification message to the IMS core network device by using the interface between the eNB and the IMS core network device. Alternatively, the eNB may send the first notification message to the IMS core network device by using the user plane data packet.

It should be noted that for a specific method for sending, by the eNB, the first notification message to the IMS core network device by using the interface between the eNB and the IMS core network device or by using the user plane data packet, reference may be made to the method for sending, by the eNB, the first setup response to the IMS core network device by using the interface between the eNB and the IMS core network device or by using the user plane data packet in the foregoing embodiment, and details are not described in this embodiment of this application again.

Further, the method in this embodiment of this application may further include:

if the eNB determines that the service requirement of the VoLTE service includes second indication information, and the eNB determines that a second cell whose radio channel quality satisfies the service requirement of the VoLTE service exists, handing over, by the eNB, the UE to the second cell; or if the eNB determines that the service requirement of the VoLTE service includes third indication information, and the eNB determines that a third cell whose radio channel quality satisfies the service requirement of the VoLTE service exists, handing over, by the eNB, the UE to the third cell.

It should be noted that for a specific method for handing over, by the eNB, the UE to the second cell or the third cell in this embodiment of this application, reference may be made to the detailed descriptions in the foregoing embodiment, and details are not described in this embodiment of this application again.

The second cell or the third cell whose radio channel quality satisfies the service requirement of the VoLTE service may not exist. In this case, as shown in FIG. 11A and FIG. 11B, the method in this embodiment of this application may further include: if the eNB determines that the second cell or the third cell whose radio channel quality satisfies the service requirement of the VoLTE service does not exist, sending, by the eNB, a second notification message to the IMS core network device; and receiving, by the IMS core network device, the second notification message from the eNB. The second notification message is used to notify the IMS core network device that the radio channel quality of the first cell does not satisfy the service requirement of the VoLTE service and the second cell or the third cell whose radio channel quality satisfies the service requirement of the VoLTE service does not exist. The second notification message carries at least one of the radio channel quality of the 4G network cell (to be specific, the first cell) in which the UE is located, the terminal type information of the UE, the information about the carrier frequency accessed by the UE, the location information of the UE, the load information of the 4G network cell in which the UE is located, the RAT information of the 4G network in which the UE is located, and the bandwidth information of the VoLTE service.

S1110. The IMS core network device determines an updated service requirement of the VoLTE service based on the received first notification message or a received second notification message.

It should be noted that for a method for determining, by the IMS core network device, the updated service requirement of the VoLTE service based on the received first notification message or second notification message, reference may be made to the method for determining, by the IMS core network device, the updated service requirement of the video call service based on the received first setup response or second setup response in S707, and details are not described in this embodiment of this application again.

S1111. The IMS core network device sends a first service modification request of the VoLTE service to the eNB, where the first service modification request carries the updated service requirement of the VoLTE service.

For example, as shown in FIG. 11A and FIG. 11B, for a specific method for sending, by the IMS core network device, the first service modification request of the VoLTE service to the eNB in S1111, refer to the specific method for sending, by the IMS core network device, the second setup request of the video call service to the eNB in S708 in the foregoing embodiment, and details are not described in this embodiment of this application again.

S1112. The eNB receives the first service modification request from the IMS core network device.

As shown in FIG. 11A and FIG. 11B, the receiving, by the eNB, the first service modification request from the IMS core network device may be specifically: receiving a create bearer request carrying an updated RSRP requirement.

After receiving the updated service requirement of the VoLTE service, the eNB may continue to determine whether the radio channel quality of the 4G network cell in which the UE is located satisfies the updated service requirement of the VoLTE service, and perform a subsequent corresponding process. As shown in FIG. 11A and FIG. 11B, the method in this embodiment of this application may further include S1112 and a subsequent operation. After S1112, the eNB may determine whether the radio channel quality of the 4G network cell in which the UE is located satisfies the updated service requirement of the VoLTE service carried in the first service modification request.

Further, in this embodiment of this application, the IMS core network device may terminate the VoLTE service after receiving the first notification message or the second notification message. For a method for terminating, by the IMS core network device, the VoLTE service based on the first notification message or the second notification message, refer to the method for terminating, by the IMS core network device, the video call service based on the first setup response or the second setup response in the foregoing embodiment 2, and details are not described in this embodiment of this application again.

In the service setup method provided in this embodiment of this application, in the process of setting up the VoLTE service for the UE, the IMS core network device may deliver the service requirement of the VoLTE service to the eNB. The eNB may receive the service setup request carrying the service requirement of the VoLTE service. Correspondingly, the eNB may use the received service requirement of the VoLTE service as an admission threshold of VoLTE service setup. To be specific, when radio signal quality of the cell in which the UE is located does not satisfy the service requirement of the VoLTE service, the eNB may refuse to allocate the radio resource to the VoLTE service, and at the same time, notify the IMS core network device, so that the IMS core network device makes a corresponding adjustment to the service requirement of the VoLTE service, to complete VoLTE service setup in this cell. Alternatively, the eNB may hand over the UE to another 4G cell or 2G/3G cell that can satisfy the service requirement, to complete VoLTE service setup in the another cell. By using this solution, a network side may adaptively determine an admission threshold of service setup depending on a requirement, thereby avoiding prior-art problems such as an error and inflexibility caused by determining an admission threshold only based on an empirical value. In addition, for a scenario in which the signal quality of the cell of the UE does not reach the admission threshold, for example, a coverage area in which a network signal is weak, the network side may adjust the service requirement depending on an actual network status, or hand over the UE to another cell, to ensure that after a service is set up, the service can be normally executed and user experience during the execution of the service is improved.

It should be noted that the foregoing embodiment describes, merely by using a VoLTE service in a 4G network as an example, the service setup method provided in the embodiments of this application.

Further, after the VoLTE service is successfully set up among the calling UE, the IMS core network device (marked as an IMS core network device 1, which may be the first service application server in the foregoing embodiment) responsible for the VoLTE service, and the called UE, the calling UE may save, as a measurement report threshold, the service requirement of the VoLTE service delivered by the IMS core network device responsible for the VoLTE service. In this embodiment of this application, an IMS core network device responsible for a second service (for example, a video call service) is marked as an IMS core network device 2, to be specific, may be the second service application server in the foregoing embodiment. The VoLTE service is the first service in the foregoing embodiment, and the video call service is the second service in the foregoing embodiment. Specifically, the method in this embodiment of this application may further include S1201.

S1201. The IMS core network device 2 sends a second setup request to the eNB, to trigger the eNB to allocate a radio resource to a video call service, where the second setup request carries a service requirement of the video call service.

S1202. The eNB receives the second setup request from the IMS core network device 2.

S1203. The eNB determines that the service requirement of the VoLTE service is lower than the service requirement of the video call service.

For example, using an example in which both the service requirement of the VoLTE service and the service requirement of the video call service are RSRP requirements, the eNB may directly compare the RSRP requirement of the VoLTE service with an RSRP requirement of the video call service. Assuming that the RSRP requirement of the VoLTE service is −115 dBm, and the RSRP requirement of the video call service is −110 dBm, the eNB determines that the service requirement of the VoLTE service is lower than the service requirement of the video call service.

Alternatively, when a specific parameter of the service requirement of the VoLTE service is different from a specific parameter of the service requirement of the video call service, for example, the service requirement of the VoLTE service is an RSRP requirement (which is specifically −115 dBm), and the service requirement of the video call service is an SINR requirement (which is specifically 3 dBm), the eNB may first map the SINR requirement of the video call service into an RSRP requirement (for example, −110 dBm), or may first map the RSRP requirement of the VoLTE service into an SINR requirement (for example, 2 dBm), and then perform comparison.

S1204. The eNB determines that the radio channel quality of the 4G cell in which the UE is currently located cannot satisfy the service requirement of the video call service.

After S1204, S1109 and a subsequent process may be performed.

In the service setup method provided in this embodiment of this application, in a scenario in which the UE executes both the VoLTE service and the video call service, the eNB may compare the service requirements of the two services, and select a higher service requirement, for example, the service requirement of the video call service, as the measurement report threshold of the UE. This helps the eNB to determine, in a timely manner, whether downlink radio channel quality of the cell in which the UE is located reaches a corresponding handover threshold of a service requirement of a current service (for example, the video call service), and trigger, in a timely manner, handover of the UE to another cell that can satisfy the requirement of the video call service, or indicate the service application server to modify, in a timely manner, a service requirement of a corresponding service. In addition, if the service requirement of the video call service is higher than the service requirement of the VoLTE service, if the downlink radio channel quality of the cell in which the UE is located satisfies the service requirement of the video call service, the downlink radio channel quality of the cell in which the UE is located can satisfy the service requirement of the VoLTE service, ensuring normal execution of the VoLTE service, and ensuring voice call quality.

It should be noted that the method in the embodiments of this application is described merely by using an example in which both the VoLTE service and the video call service are executed in this embodiment of this application. The method in the embodiments of this application may be extended to a plurality of other types of services.

Further, in this embodiment of this application, the IMS core network device may further update the service requirement of the VoLTE service in real time.

For example, parameters affecting the service requirement of the VoLTE service include but are not limited to the radio channel quality (for example, RSRP, RSRQ, or an SINR) of the 4G network cell in which the UE is located, a location of the UE, the information about the carrier frequency accessed by the UE, time information, the load information of the 4G network cell in which the UE is located, codec information of the VoLTE service, and the bandwidth information of the VoLTE service. The IMS core network device may update the service requirement of the VoLTE service in real time based on changes of the parameters. Before updating the service requirement of the VoLTE service in real time, the IMS core network device may obtain, from the UE, the parameters affecting the service requirement of the VoLTE service.

It may be figured out that to adapt to a change of a quantity of network users, the IMS core network device may further deliver different service requirements to the eNB for the VoLTE service in different time periods. For example, an RSRP requirement delivered in a busy time (for example, when there is a large quantity of users in the daytime) may be −110 dBm, and an RSRP requirement delivered in an idle time (when there is a small quantity of users at night) may be −120 dBm. If the IMS core network device detects that the time information changes from the busy time to the idle time, the IMS core network device may determine that the RSRP requirement may be updated from −110 dBm to −120 dBm.

Alternatively, the IMS core network device may update the service requirement of the VoLTE service to a service requirement corresponding to current codec information when codec information negotiated about between the calling UE, the IMS core network device, and the called UE changes.

Alternatively, the IMS core network device may update the service requirement of the VoLTE service in real time based on a change of the MOS of the VoLTE service. For example, a current MOS of the VoLTE service is 3.5, and is lower than a preset value 4 of the MOS requirement of the VoLTE service. Then, the IMS core network device may update the service requirement of the VoLTE service to a service requirement corresponding to the MOS of 3.5.

In the service setup method provided in the embodiments of this application, the service requirement of the VoLTE service may be updated in real time, to ensure normal execution of the VoLTE service, and ensure the voice call quality.

The foregoing mainly describes the solutions of the embodiments of this application from a perspective of interaction between the access network device and devices such as the service application server and the core network device. It may be understood that to implement the foregoing functions, the access network device and the service application server include hardware structures and/or software modules corresponding to the functions. A person skilled in the art should easily learn that the access network device, the service application server, and algorithm steps in the examples described with reference to the embodiments disclosed in this specification can be implemented by hardware or a combination of hardware and computer software in this application. Whether a function is performed by hardware or by computer software driving hardware depends on a particular application and a design constraint condition of the technical solutions. A person skilled in the art may use different methods to implement the described functions for each particular application, but it should not be considered that the implementation goes beyond the scope of this application.

In the embodiments of this application, module or unit division may be performed on the access network device or the service application server based on the examples of the methods. For example, each module or unit may be obtained through division for each corresponding function, or at least two functions may be integrated into one processing module. The module or unit division in the embodiments of this application is an example, and is merely a logical function division, and there may be another division manner during actual implementation.

Figure 12:
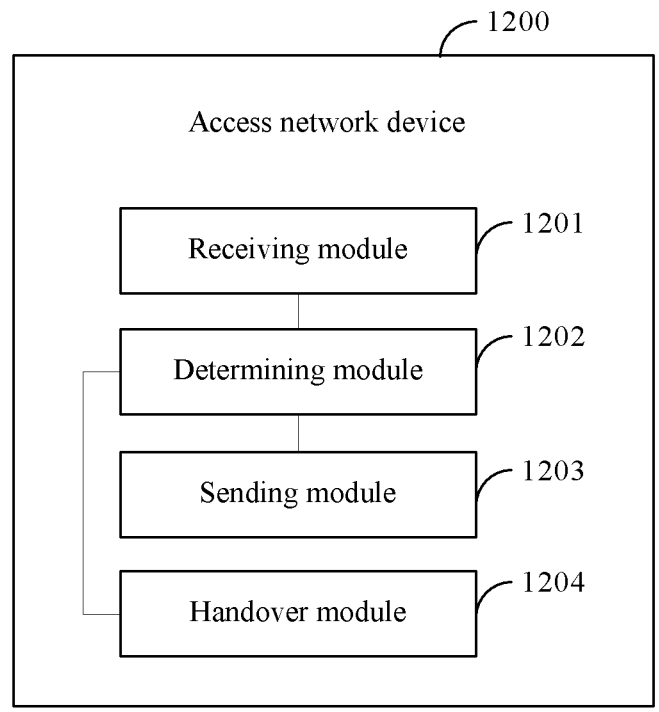
FIG. 12 is a schematic structural diagram of an access network device according to an embodiment of this application.

FIG. 12 is a possible schematic structural diagram of the access network device used in the foregoing embodiment. The access network device 1200 includes a receiving module 1201, a determining module 1202, a sending module 1203, and a handover module 1204. The receiving module 1201 is configured to receive a request message or another type of message from devices such as a service application server, a core network device, and UE. For example, the receiving module 1201 is configured to support S302 in any one of FIG. 3 to FIG. 6, S311 in FIGS. 6, S704 and S709 in FIG. 7A and FIG. 7B, S802 in any one of FIG. 8 to FIGS. 10, S1104 and S1112 in FIG. 11A and FIG. 11B, and/or other processes of the technology described in this specification. The determining module 1202 is configured to determine whether radio channel quality of a first cell of a first network in which the UE is located satisfies a service requirement of a to-be-set up service. For example, the determining module 1202 is configured to support S303 in any one of FIG. 3 to FIGS. 6, S705 and S710 in FIG. 7A and FIG. 7B, S804 in any one of FIG. 8 to FIGS. 10, S1105 and S1108 in FIG. 11A and FIG. 11B, and/or other processes of the technology described in this specification. The sending module 1203 is configured to send a response message, a query message, or another type of message to the devices such as the service application server, the core network device, and the UE. For example, the sending module 1203 is configured to support S304 in FIG. 3, S304' in any one of FIG. 4 to FIG. 6, S308 in FIG. 5 or FIGS. 6, S706 and S711 in FIG. 7A and FIG. 7B, S803 and S805 in FIGS. 8, S803 and S805' in FIG. 9, S803, S811, and S805' in FIGS. 10, S1107 and S1109 in FIG. 11A and FIG. 11B, and/or other processes of the technology described in this specification. The handover module 1204 is configured to hand over the UE between cells when the determining module 1202 determines that the radio channel quality of the first cell does not satisfy the service requirement of the to-be-set up service. For example, the handover module 1204 is configured to support S306 and S307 in FIG. 3, S306' and S307' in any one of FIG. 4 to FIGS. 6, S807 and S808 in FIG. 8, S807' and S808' in FIG. 9 or FIG. 10, and/or other processes of the technology described in this specification.

The access network device 1200 includes but is not limited to the foregoing listed function modules. For example, the access network device 1200 may further include: an allocation module, configured to allocate a radio resource to the UE when the determining module 1202 determines that the radio channel quality of the first cell satisfies the service requirement of the to-be-set up service; a deletion module, configured to: when the determining module 1202 determines that the radio channel quality of the first cell does not satisfy the service requirement of the to-be-set up service, delete the radio resource allocated by the allocation module to the UE; and the like. In addition, functions that the foregoing function modules can specifically implement include but are not limited to the functions corresponding to the steps in the methods described in the foregoing examples. For other function units of the access network device 1200 and detailed descriptions of each function unit of the access network device 1200, refer to the detailed descriptions of the steps in the corresponding methods, and details are not described in this embodiment of this application again.

The modules may be implemented by using hardware, or may be implemented by using software function modules or function units.

When an integrated unit is used, the function modules such as the determining module 1202, the handover module 1204, the allocation module, and the deletion module may be integrated into one processing unit for implementation. The processing unit may be a processor or a controller, for example, may be a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processor or controller may implement or execute logical block diagrams, modules, and circuits of the examples described with reference to the content disclosed in this application. The processing unit may be a combination implementing a computing function, for example, a combination including one or more microprocessors, or a combination of a DSP and a microprocessor. The receiving module 1201 and the sending module 1203 may be integrated into one communications unit for implementation. The communications unit may be a communications interface, a transceiver circuit, a transceiver, or the like.

Figure 13:
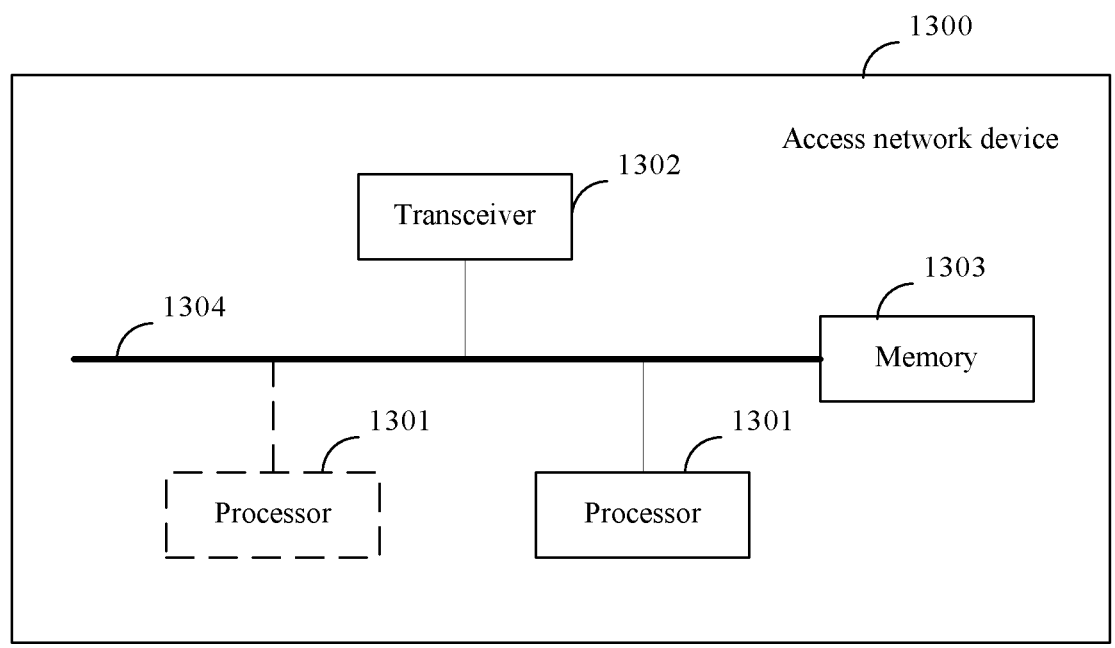
FIG. 13 is a schematic structural diagram of another access network device according to an embodiment of this application.

When the processing unit is a processor and the communications unit is a communications interface, the access network device 1200 in this embodiment of this application may be an access network device 1300 shown in FIG. 13. As shown in FIG. 13, the access network device 1300 includes one or more processors 1301, a transceiver 1302, a memory 1303, and a bus 1304. The processor 1301, the transceiver 1302, and the memory 1303 are connected by using the bus 1304. The memory is configured to store one or more application programs. The one or more application programs include an instruction. When the processor 1301 of the access network device 1300 executes the instruction, the access network device 1300 performs steps in the related method in any one of FIG. 3 to FIG. 11A and FIG. 11B, and implements the service setup method in the foregoing embodiment by interacting with a device such as a service application server.

The bus 1304 may be a peripheral component interconnect (PCI) bus, an extended industry standard architecture (EISA) bus, or the like. The bus 1304 may be classified into an address bus, a data bus, a control bus, and the like. For ease of representation, the bus is represented in FIG. 13 by using only one bold line, but it does not indicate that there is only one bus or only one type of bus.

An embodiment of this application further provides a non-volatile storage medium. The non-volatile storage medium stores one or more pieces of program code. When the processor 1301 of the access network device 1300 executes the program code, the access network device 1300 performs the steps in the related method in any one of FIG. 4 to FIG. 11A and FIG. 11B, and implements the service setup method in the foregoing embodiment by interacting the device such as a service application server.

For detailed descriptions of function units or function modules in the access network device provided in this embodiment of this application and technical effects obtained after the function units or function modules perform the steps in the related method in any one of FIG. 4 to FIG. 11A and FIG. 11B, refer to the related descriptions in the method embodiments of this application, and details are not described herein again.

Figure 14:
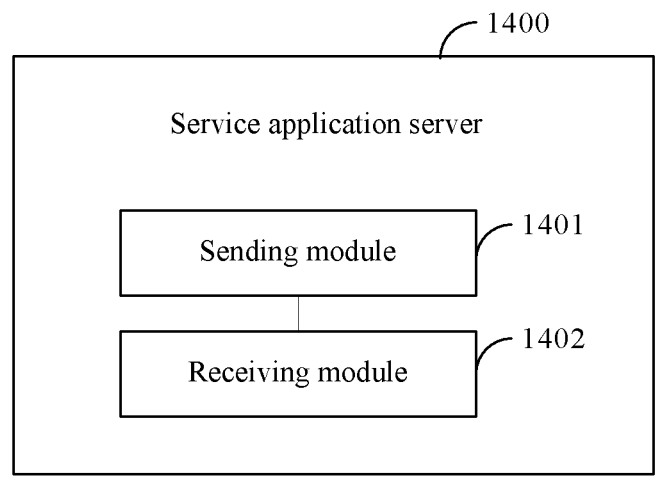
FIG. 14 is a schematic structural diagram of a service application server according to an embodiment of this application.

FIG. 14 is a possible schematic structural diagram of the service application server used in the foregoing embodiment. The service application server 1400 includes a sending module 1401 and a receiving module 1402. The sending module 1401 is configured to send a request message or another type of message to devices such as an access network device, a core network device, and UE. For example, the sending module 1401 is configured to support S301 in any one of FIG. 3 to FIG. 6, S310 in FIGS. 6, S703 and S708 in FIG. 7A and FIG. 7B, S801 in any one of FIG. 8 to FIGS. 10, S1103 and S1111 in FIG. 11A and FIG. 11B, and/or other processes of the technology described in this specification. The receiving module 1402 is configured to receive a response message, a query message, or another type of message from the devices such as the access network device, the core network device, and the UE. For example, the receiving module 1402 is configured to support S305 in any one of FIG. 3 to FIG. 6, S309 in FIG. 5 or FIG. 6, S707 in FIG. 7A and FIG. 7B, S806 in any one of FIG. 8 to FIG. 10, S812 in FIGS. 10, S1107 and S1109 in FIG. 11A and FIG. 11B, and/or other processes of the technology described in this specification.

Figure 15:
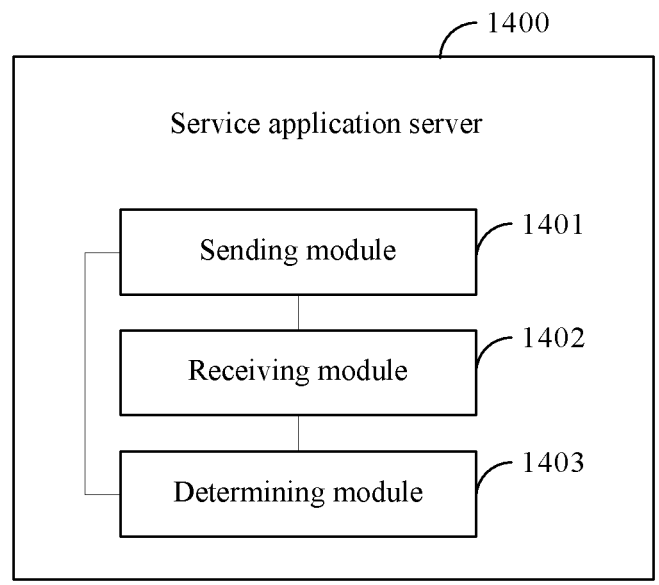
FIG. 15 is a schematic structural diagram of another service application server according to an embodiment of this application.

Further, as shown in FIG. 15, the service application server 1400 may further include a determining module 1403. The determining module 1403 is configured to determine a service requirement of a to-be-set up service or an updated service requirement of a to-be-set up service. For example, the determining module 1403 is configured to support S702 and S707 in FIG. 7A and FIG. 7B, S1102 and S1110 in FIG. 11A and FIG. 11B, and/or other processes of the technology described in this specification. The receiving module 1402 may be further configured to receive related information used by the determining module 1403 to determine the service requirement of the to-be-set up service or the updated service requirement of the to-be-set up service.

The service application server 1400 includes but is not limited to the foregoing listed function modules. For example, the service application server 1400 may further include a change module, configured to change codec information. In addition, functions that the foregoing function modules can specifically implement include but are not limited to the functions corresponding to the steps in the methods described in the foregoing examples. For other function units of the service application server 1400 and detailed descriptions of each function unit of the service application server 1400, refer to the detailed descriptions of the steps in the corresponding methods, and details are not described in this embodiment of this application again.

When an integrated unit is used, the function modules such as the determining module 1403 and the change module may be integrated into one processing unit for implementation. The processing unit may be a processor or a controller, for example, may be a CPU, a general-purpose processor, a DSP, an ASIC, an FPGA or another programmable logic device, a transistor logic device, a hardware component, or any combination thereof. The processor or controller may implement or execute logical block diagrams, modules, and circuits of the examples described with reference to the content disclosed in this application. The processing unit may be a combination implementing a computing function, for example, a combination including one or more microprocessors, or a combination of a DSP and a microprocessor. The sending module 1401 and the receiving module 1402 may be integrated into one communications unit for implementation. The communications unit may be a communications interface, a transceiver circuit, a transceiver, or the like.

Figure 16:
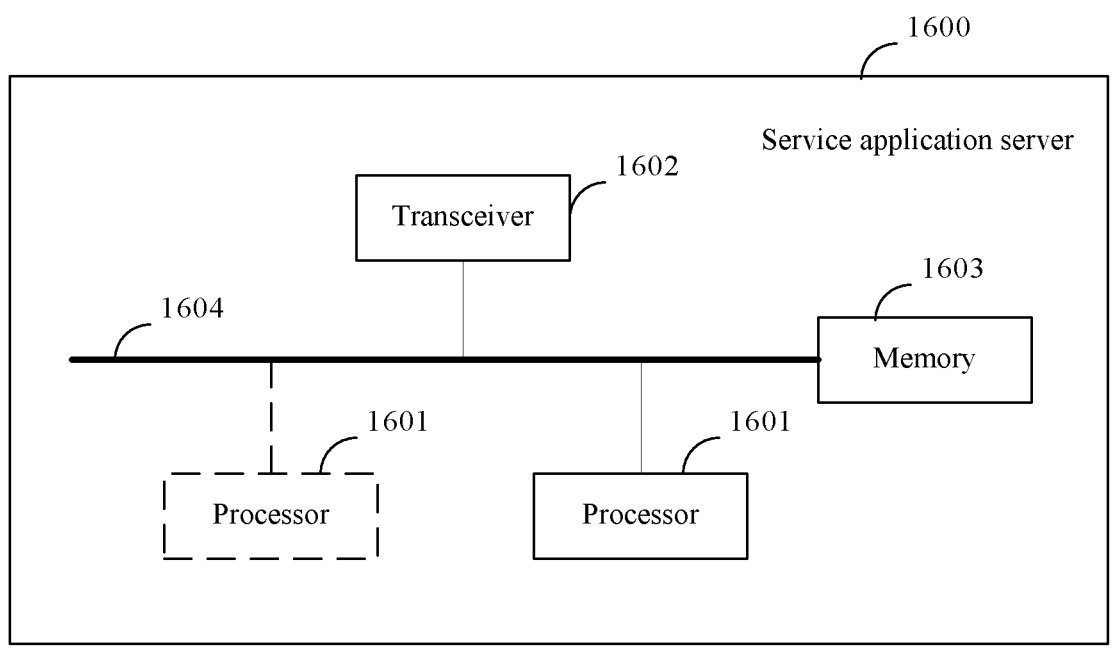
FIG. 16 is a schematic structural diagram of another service application server according to an embodiment of this application.

When the processing unit is a processor and the communications unit is a communications interface, the service application server 1400 in this embodiment of this application may be a service application server 1600 shown in FIG. 16. As shown in FIG. 16, the service application server 1600 includes one or more processors 1601, a transceiver 1602, a memory 1603, and a bus 1604. The processor 1601, the transceiver 1602, and the memory 1603 are connected by using the bus 1604. The memory is configured to store one or more application programs. The one or more application programs include an instruction. When the processor 1601 of the service application server 1600 executes the instruction, the service application server 1600 performs the steps in the related method in any one of FIG. 3 to FIG. 11A and FIG. 11B, and implements the service setup method in the foregoing embodiment by interacting with a device such as a service application server.

The bus 1604 may be a PCI bus, an EISA bus, or the like. The bus 1604 may be classified into an address bus, a data bus, a control bus, and the like. For ease of representation, the bus is represented in FIG. 16 by using only one bold line, but it does not indicate that there is only one bus or only one type of bus.

An embodiment of this application further provides a non-volatile storage medium. The non-volatile storage medium stores one or more pieces of program code. When the processor 1601 of the service application server 1600 executes the program code, the service application server 1600 performs the steps in the related method in any one of FIG. 4 to FIG. 11A and FIG. 11B, and implements the service setup method in the foregoing embodiment by interacting with a device such as a service application server.

For detailed descriptions of function units or function modules in the service application server provided in this embodiment of this application and technical effects obtained after the function units or function modules perform the steps in the related method in any one of FIG. 4 to FIG. 11A and FIG. 11B, refer to the related descriptions in the method embodiments of this application, and details are not described herein again.

The foregoing descriptions about implementations allow a person skilled in the art to understand that, for convenience and brevity of description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service setup method carried out by an access network device in a first network, the method comprising:
   receiving, from a core network device, a setup request that carries a first service requirement of a service that indicates, to the access network device, a first radio channel quality requirement for a user equipment (UE) to execute the service, wherein the first service requirement corresponds to a first codec information of the service, and wherein the first service requirement is used by the access network device for a first handover threshold decision for the service;
   determining radio channel quality of a first cell of the first network in which the UE is located does not satisfy the first handover threshold;
   determining that radio quality does not satisfy the first service requirement in both a second cell of the first network and a third cell of a second network;
   sending, to the core network device, a notification message that notifies the core network device that it has been determined that:
      the radio channel quality of the first cell does not satisfy the first service requirement, and
      the radio channel quality of the second cell and the third cell does not satisfy the first service requirement; and
   receiving, from the core network device, a service modification request that carries a second service requirement of the service,
   wherein the second service requirement indicates, to the access network device, a second radio channel quality requirement for the UE to execute the service,
   wherein the second service requirement corresponds to a second codec information of the service,
   wherein the second service requirement is used by the access network device for a second handover threshold decision for the service, and
   wherein the first radio channel quality requirement is higher than the second radio channel quality requirement.

2. The method according to claim 1, wherein the first service requirement comprises indication information that indicates to the access network device to send the notification message to the core network device when the first radio channel quality of the first cell does not satisfy the first service requirement.

3. An access network device, comprising:
   a receiver configured to receive, from a core network device, a setup request that carries a first service requirement of a service that indicates, to the access network device, a first radio channel quality requirement for user equipment (UE) to execute the service, wherein the first service requirement corresponds to a first codec information of the service, and wherein the first service requirement is used by the access network device for a first handover threshold decision for the service;
   a processor coupled to the receiver and configured to:
      determine radio channel quality of a first cell of the first network in which the UE is located does not satisfy the first handover threshold;
      determine that radio quality does not satisfy the first service requirement in both a second cell of the first network and a third cell of a second network; whose radio channel quality satisfies the first service requirement does not exist; and a transmitter configured to send, to the core network device, a notification message that notifies the core network device that it has been determined that:
the radio channel quality of the first cell does not satisfy the first service requirement, and
the radio channel quality of the second cell and the third cell does not satisfy the first service requirement;
wherein the receiver is further configured to receive, from the core network device, a service modification request that carries a second service requirement of the service,
wherein the second service requirement indicates, to the access network device, a second radio channel quality requirement for the UE to execute the service,
wherein the second service requirement corresponds to a second codec information of the service,
wherein the second service requirement is used by the access network device for a second handover threshold decision for the service, and
wherein the first radio channel quality requirement is higher than the second radio channel quality requirement.

4. The access network device according to claim 3, wherein the first service requirement comprises indication information that indicates to the access network device to send the notification message to the core network device when the first radio channel quality of the first cell does not satisfy the first service requirement.

5. A non-transitory computer readable storage medium, storing an instruction, which when executed by at least one processor, causes an apparatus comprising the at least one processor to:
receive, from a core network device, a setup request that carries a first service requirement of a service that indicates, to the apparatus, a first radio channel quality requirement for a user equipment (UE) to execute the service, wherein the first service requirement corresponds to a first codec information of the service, and wherein the first service requirement is used by the access network device for a first handover threshold decision for the service;
determine that radio quality does not satisfy the first service requirement in both a second cell of the first network and a third cell of a second network;
send, to the core network device, a notification message that notifies the core network device that it has been determined that:
the radio channel quality of the first cell does not satisfy the first service requirement, and
the radio channel quality of the second cell and the third cell does not satisfy the first service requirement; and
receive, from the core network device, a service modification request that carries a second service requirement of the service,
wherein the second service requirement indicates, to the access network device, a second radio channel quality requirement for the UE to execute the service,
wherein the second service requirement corresponds to a second codec information of the service,
wherein the second service requirement is used by the access network device for a second handover threshold decision for the service, and
wherein the first radio channel quality requirement is higher than the second radio channel quality requirement.

6. The A non-transitory computer readable storage medium of claim 5, wherein the first service requirement comprises indication information that indicates to the access network device to send the notification message to the core network device when the first radio channel quality of the first cell does not satisfy the first service requirement.

7. A method, comprising:
sending, by a core network device to an access network device in a first network, a setup request that carries a first service requirement of a service that indicates, to the access network device, a first radio channel quality requirement for a user equipment (UE) to execute the service, wherein the first service requirement corresponds to a first codec information of the service, and wherein the first service requirement is used by the access network device for a first handover threshold decision for the service;
determining, by the access network device, radio channel quality of a first cell of the first network in which the UE is located does not satisfy the first handover threshold;
determining, by the access network device, that radio quality does not satisfy the first service requirement in both a second cell of the first network and a third cell of a second network;
sending, by the access network device to the core network device, a notification message that notifies the core network device that it has been determined that:
the radio channel quality of the first cell does not satisfy the first service requirement, and
the radio channel quality of the second cell and the third cell does not satisfy the first service requirement;
receiving, by the network device from the core network device, a service modification request that carries a second service requirement of the service,
wherein the second service requirement indicates, to the access network device, a second radio channel quality requirement for the UE to execute the service,
wherein the second service requirement corresponds to a second codec information of the service,
wherein the second service requirement is used by the access network device for a second handover threshold decision for the service, and
wherein the first radio channel quality requirement is higher than the second radio channel quality requirement.

8. The method according to claim 7, wherein the first service requirement comprises indication information that indicates to the access network device to send the notification message to the core network device when the first radio channel quality of the first cell does not satisfy the first service requirement.

9. A system, comprising:
an access network device; and
a core network device configured to send, to the access network device in a first network, a setup request that carries a first service requirement of a service that indicates, to the access network device, a first radio channel quality requirement for a user equipment (UE) to execute the service, wherein the first service requirement corresponds to a first codec information of the service, and wherein the first service requirement is used by the access network device for a first handover threshold decision for the service;
wherein the access network device comprises at least one processor and a memory coupled with the at least one processor,
wherein the memory stores an instruction, which when executed by the at least one processor, causes the access network device to:

receive the setup request from the core network device;

determine radio channel quality of a first cell of the first network in which the UE is located does not satisfy the first handover threshold;

determine that radio quality does not satisfy the first service requirement in both a second cell of the first network and a third cell of a second network;

send, to the core network device, a notification message that notifies the core network device that it has been determined that:

the radio channel quality of the first cell does not satisfy the first service requirement, and the radio channel quality of the second cell and the third cell does not satisfy the first service requirement; and receive, from the core network device, a service modification request that carries a second service requirement of the service, wherein the second service requirement indicates, to the access network device, a second radio channel quality requirement for the UE to execute the service, wherein the second service requirement corresponds to a second codec information of the service, wherein the second service requirement is used by the access network device for a second handover threshold decision for the service, and wherein the first radio channel quality requirement is higher than the second radio channel quality requirement.

10. The system according to claim 9, wherein the first service requirement comprises indication information that indicates to the access network device to send the notification message to the core network device when the first radio channel quality of the first cell does not satisfy the first service requirement.

\* \* \* \* \*

UNITED STATES PATENT AND TRADEMARK OFFICE
CERTIFICATE OF CORRECTION

PATENT NO. : 11,277,780 B2  
APPLICATION NO. : 16/282535  
DATED : March 15, 2022  
INVENTOR(S) : Chong et al.

It is certified that error appears in the above-identified patent and that said Letters Patent is hereby corrected as shown below:

On the Title Page

Applicant (71): "HUAWEI TECHNOLOGIES CO.,LTD., Guangdong (CN)" should read -- HUAWEI TECHNOLOGIES CO.,LTD., Shenzhen (CN) --.

In the Claims

Claim 5: Column 57, between Lines 40 & 41: -- determine radio channel quality of a first cell of the first network in which the UE is located does not satisfy the first handover threshold; -- should be added.

Signed and Sealed this  
Nineteenth Day of July, 2022

Katherine Kelly Vidal  
*Director of the United States Patent and Trademark Office*